Nov. 30, 1948.  D. E. NORGAARD  2,455,265
PULSE RADAR SYSTEM
Filed April 9, 1943  6 Sheets-Sheet 2
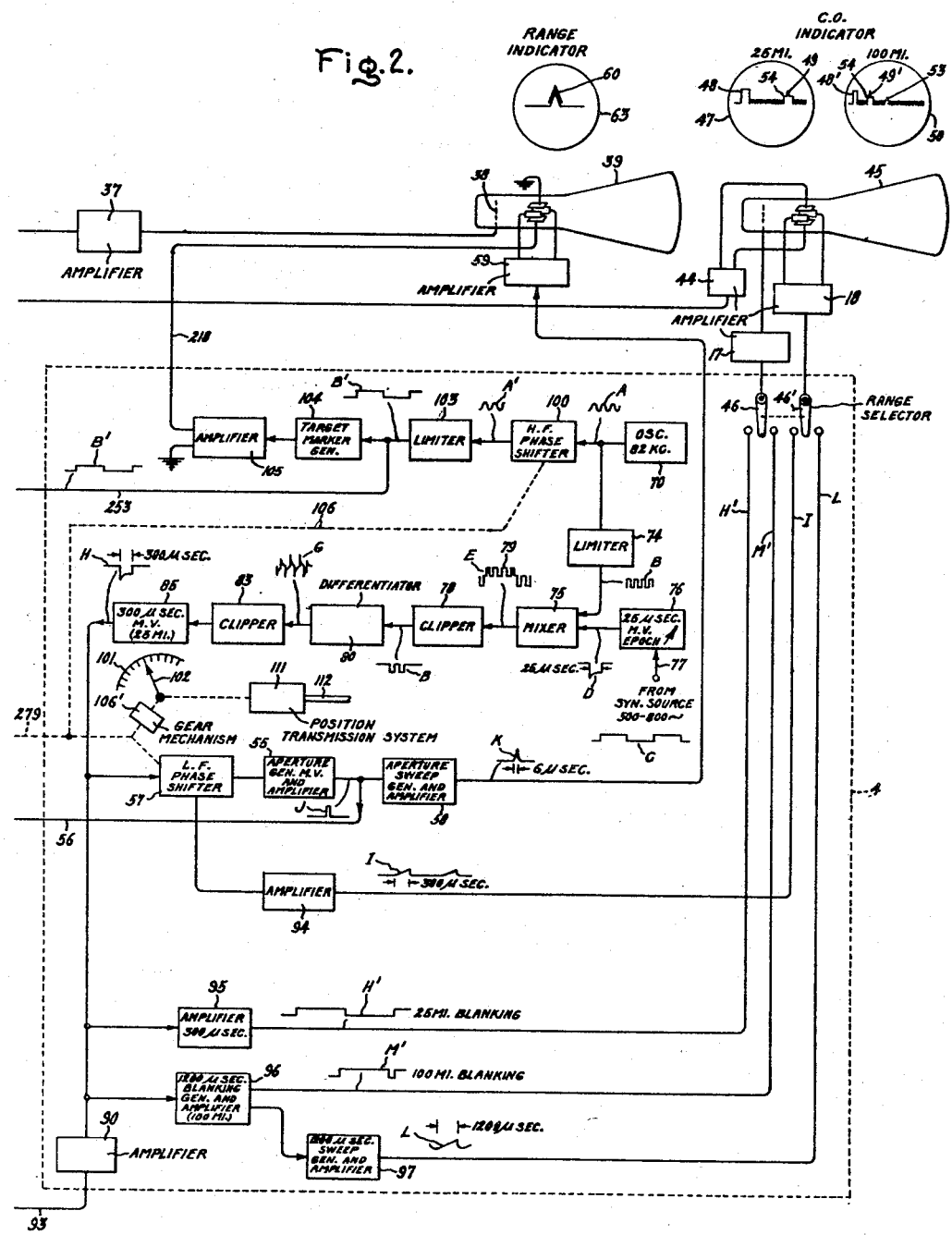
Inventor:
Donald E. Norgaard,
by Harry E. Dunham
His Attorney.

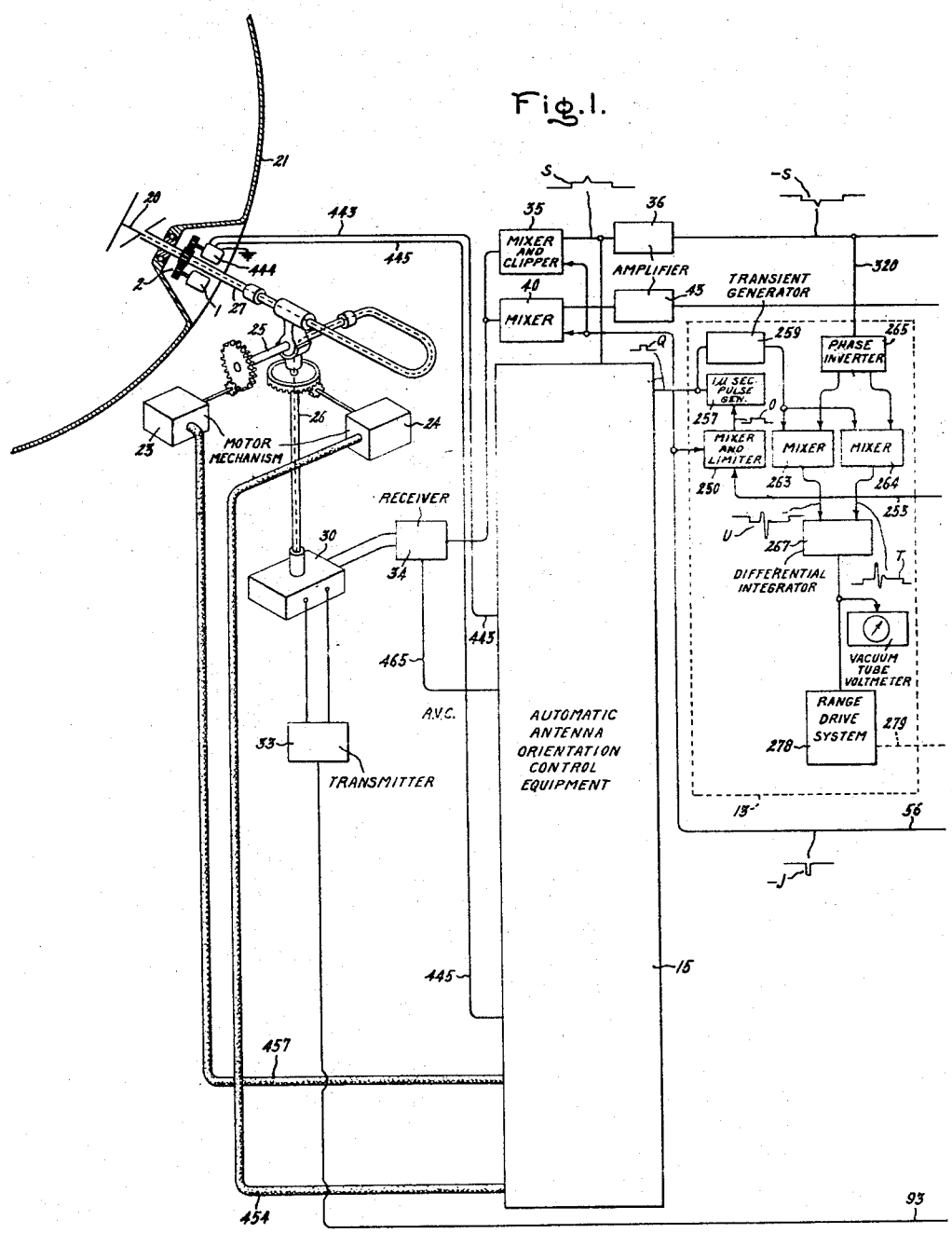

Nov. 30, 1948.    D. E. NORGAARD    2,455,265
PULSE RADAR SYSTEM
Filed April 9, 1943    6 Sheets-Sheet 3
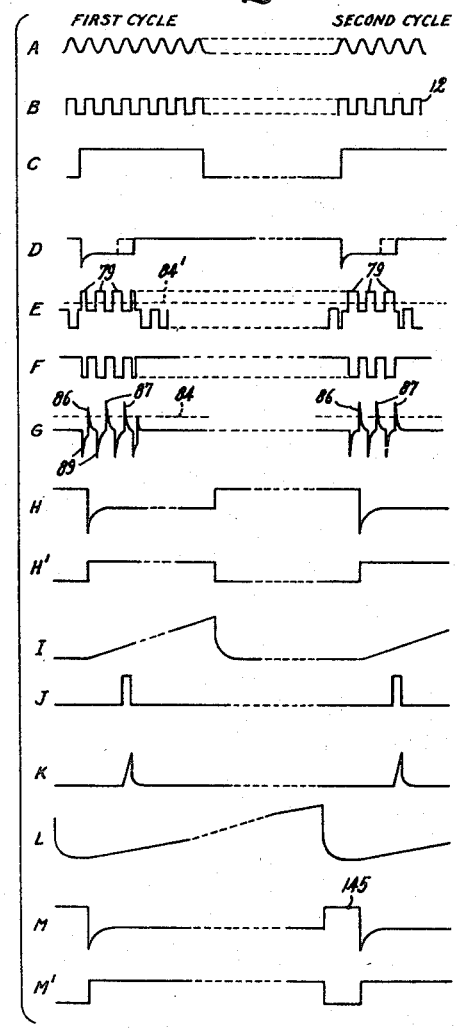
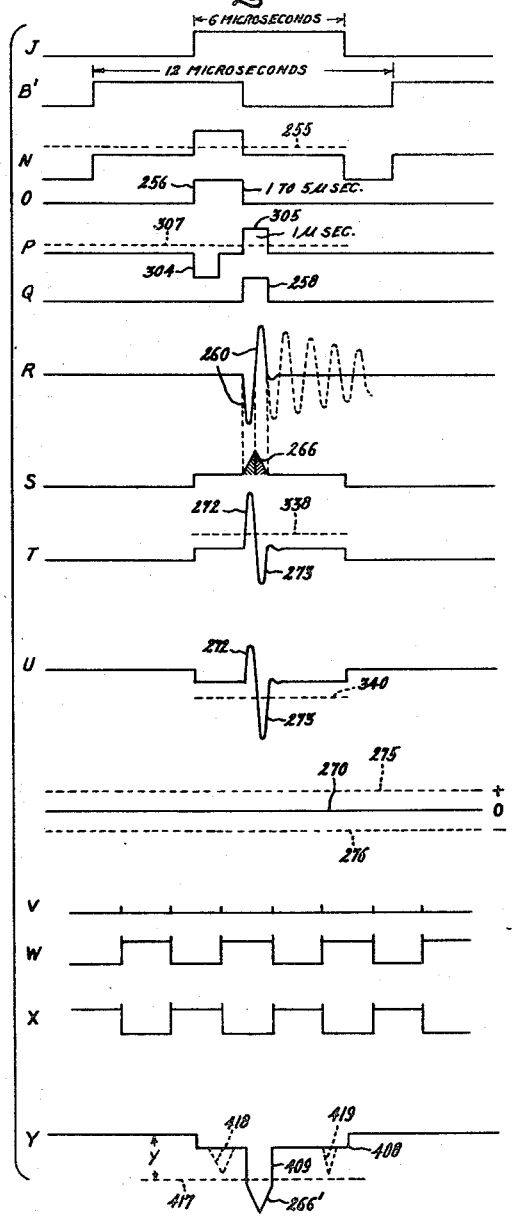
Inventor:
Donald E. Norgaard,
by Harry E. Dunham
His Attorney.

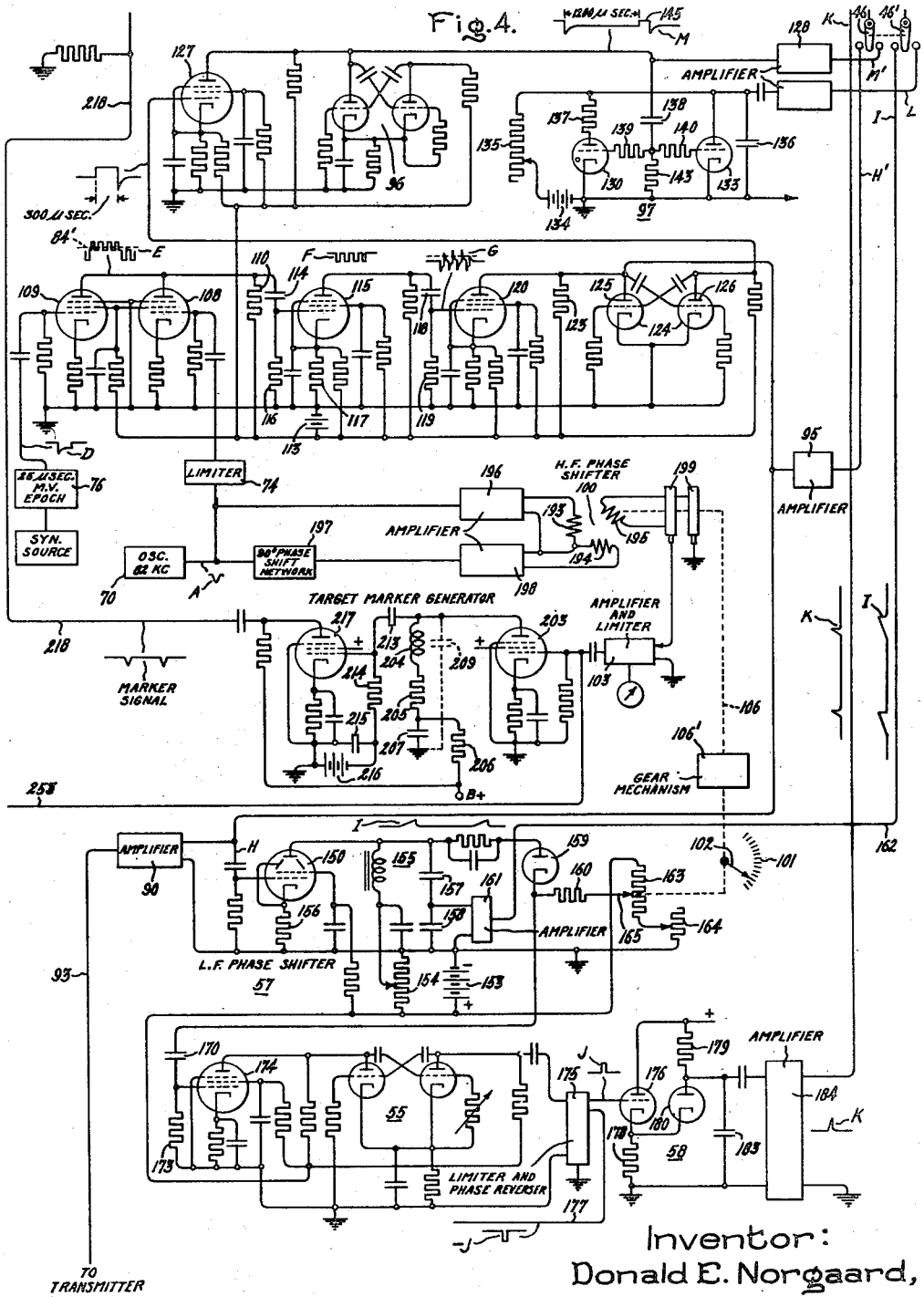

Nov. 30, 1948.   D. E. NORGAARD   2,455,265
PULSE RADAR SYSTEM
Filed April 9, 1943   6 Sheets-Sheet 5
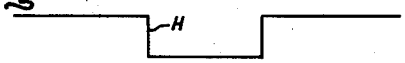
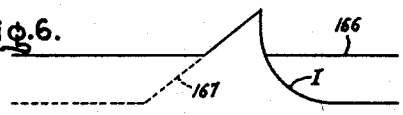
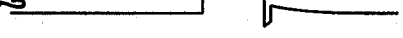
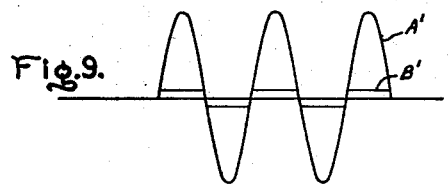
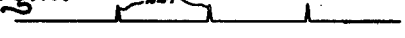
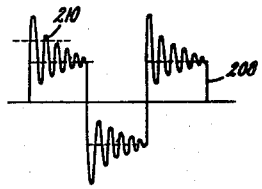
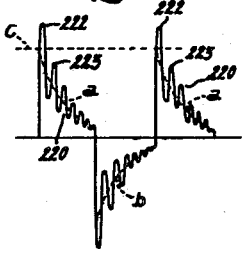
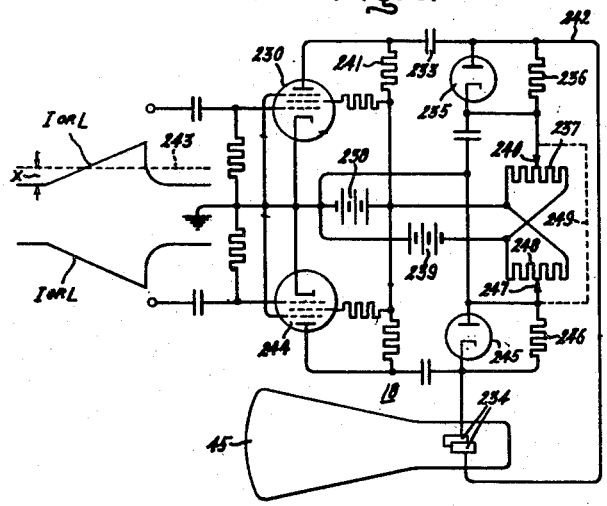
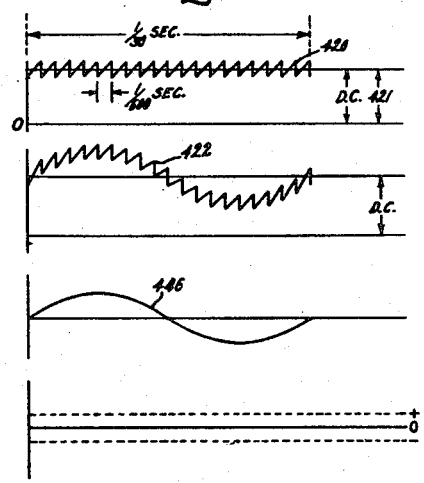
Inventor:
Donald E. Norgaard,
by Harry E. Dunham
His Attorney.

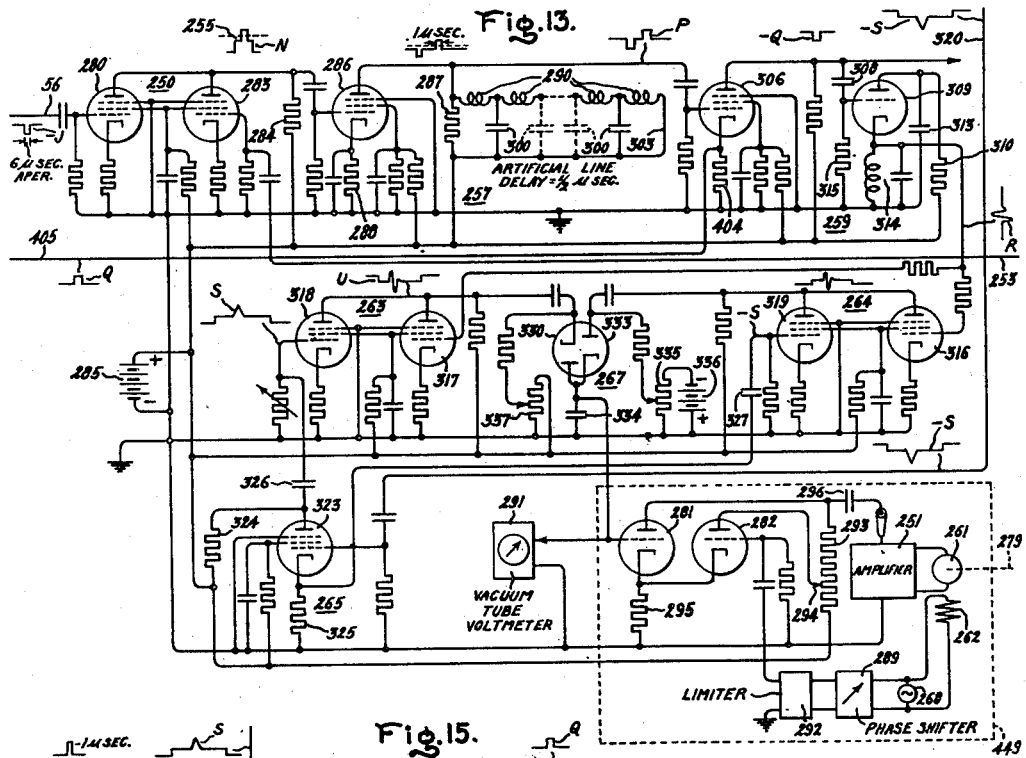
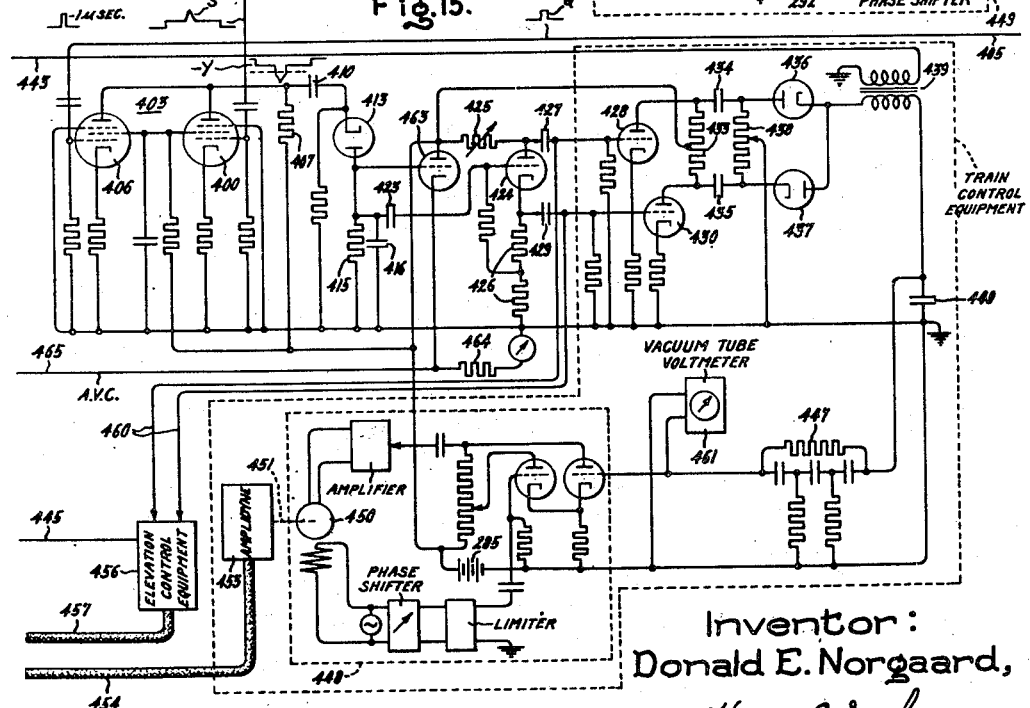
Inventor:
Donald E. Norgaard,
by Harry E. Dunham
His Attorney.

Patented Nov. 30, 1948

2,455,265

UNITED STATES PATENT OFFICE 2,455,265

PULSE RADAR SYSTEM

Donald E. Norgaard, Schenectady, N. Y., assignor to General Electric Company, a corporation of New York Application April 9, 1943, Serial No. 482,403

43 Claims. (Cl. 343—13)

My invention relates to pulse systems and, while not limited thereto, it relates more particularly to pulse systems such as are employed in echo apparatus.

In my copending application Serial No. 446,231, filed June 8, 1942, entitled Cathode ray apparatus, and assigned to the assignee of my present application, and of which this application is a continuation-in-part, is disclosed a pulse system in which periodic pulses of short wave oscillations are radiated into space and an echo of each pulse is received in the period prior to the next succeeding pulse. The radiated pulses, which may occur at relatively low repetition frequency, as, for example, five hundred pulses per second, are fixed in frequency by a source of high frequency oscillations and each radiated pulse has a duration short relative to the period of the high frequency oscillations and occurs at a fixed time in the cycle of such high frequency oscillations. A second series of pulses, referred to in that application as "target marker" pulses, is generated each occurring at a fixed period in the cycle of the high frequency wave. Means are provided whereby these target marker pulses may be made to occur either simultaneously with the radiated pulses or at a time thereafter, which time is adjustable and the length of which is related in a known way to the period of the high frequency wave. This time between the radiated pulses and occurrence of the target marker pulses may be varied until the target marker pulses occur simultaneously with any desired received echo of the radiated pulses. The distance from which the particular echo is received may then be read immediately from a suitable calibration on the means by which the time of occurrence of target marker pulses is adjusted, the calibration, of course, being one computed from the number of periods of the high frequency oscillations occurring between the radiated pulses and the target marker pulses when the latter are adjusted to coincide in time with the received echo.

One of the objects of my present invention is to provide certain simplifications in the system described in my above referred to copending application.

Another object of my invention is to provide certain economies in the means for synchronizing the radiated pulses with the high frequency wave by which the system is controlled.

A further object of my invention is to provide such a system in which the pulse rate of the radiated pulses may be varied as desired, and whereby undesired variations therein, as those due to extraneous influences affecting the equipment, are unobjectionable.

Another object of my invention relates to means for maintaining automatically the target marker pulses in time coincidence with the received echo during variations in the time of receipt of the echo whereby the system automatically follows a desired echo and furnishes a continuous indication of the distance of the remote body from which it is received and which may be in continuous motion.

Still further objects of my invention relate to means to select a particular echo and utilize it to produce a continuous indication of the range from which it is received and to maintain the receiving antenna oriented in the direction of propagation of the received echo during any variations of that direction.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings, in which Figs. 1 and 2 taken together represent an embodiment of my invention; Fig. 3 represents certain characteristics pertaining to its operation; Fig. 4 represents in greater detail that portion of the equipment of Fig. 2 which is included within the dotted polygon 4 of Fig. 2; Figs. 5 to 12 represent certain characteristics pertaining to the operation of the equipment shown in Fig. 4; Fig. 13 represents in greater detail the equipment represented by the rectangle 13 of Fig. 1; Fig. 14 represents certain characteristics pertaining to the operation of the equipment of Fig. 13; Fig. 15 represents in greater detail the equipment represented by the rectangle of Fig. 1; Fig. 16 represents in detail equipment which may be represented by the rectangle 18 of Fig. 2; and Fig. 17 represents certain characteristics of the operation of the equipment of Fig. 15.

I shall first generally indicate the character of the equipment to be described by reference to Figs. 1 and 2 of the drawings.

In the upper left hand corner of Fig. 1 an antenna system 20 is shown positioned within a reflector 21. This antenna radiates the periodic pulses to be radiated and intercepts echoes thereof. These pulses occur, for example, at a frequency of from 500 to 800 cycles per second and comprise oscillations of one meter, or other short wave length. The reflector may be any suitable conducting surface of revolution but commonly is of parabolic form. The antenna 20 is of any suitable type arranged in cooperation with the reflector 21 to project a sharp beam of radio energy into space. For purposes which will be explained in connection with equipment 15, the details of which are indicated in Fig. 15, this beam is projected at a small angle to the axis of the reflector 21 and this radiator 20 is adapted for rotation with respect to the focal point of the reflector thereby to rotate the beam about a surface of a cone the axis of which is the axis of the reflector 21. This rotation may be effected by means of a motor 1 geared to the antenna by gears 2.

This radiating system 20, including reflector 21, is arranged to be rotated both in elevation and in azimuth by suitable motor mechanisms 23 and 24, respectively, the mechanism 23 being connected by suitable gears to the shaft 25 about which the radiating system is rotated in elevation, and the mechanism 24 being connected through suitable gears to the shaft 26 about which the radiating system is rotatable in azimuth.

The radiating system is connected by a transmission line of concentric type comprising an inner conductor represented by the dotted line at 27 and an outer cylindrical conductor, or tube, through which the inner conductor extends. This conductor extends along the axis of the parabola 21, thence along the axis 25 and thence downward through the axis 26 to the equipment 30, suitable rotating joints being employed where necessary to permit the required rotation of the different parts. It will, of course, be understood that the showing of this equipment on the drawing is extremely conventional for purposes of simplicity of the drawing.

The equipment 30 receives oscillations in the form of pulses from the transmitter 33 and supplies them to the transmission line leading to the antenna. It also receives the echo pulses from the antenna and supplies them to the pulse receiver 34. It comprises equipment which protects the receiver against the intense pulses produced by the transmitter 33 and, at the same time, prevents attenuation of the received echo pulses in the output circuit of the transmitter.

The echo pulses may, of course, be pulses produced by reflection of the radiated pulses from remote reflecting surfaces, or they may be produced by equipment carried by remote bodies, such as an airplane, operating in response to the transmitted pulse. In this specification I shall refer to any pulses received as a result of the transmitted pulse as echo pulses.

The received pulses are detected in the receiver 34 and the detected pulses are supplied to the mixer 35. A portion of these pulses corresponding to particular selected echoes are supplied through buffer amplifiers 36 and 37 to the control electrode 38 of a cathode ray device 39, which is employed in determining the range of the object producing the particular selected echo. This indicator is designated "Range indicator" on the drawing.

The detected pulses are also supplied through a mixer 40 and buffer amplifiers 43 and 44 to the vertical deflection electrodes of a further cathode ray indicator 45, which may be referred to as the control operator's indicator, and which is designated on the drawings as "C. O. indicator."

The control operator's indicator is a cathode ray device arranged to indicate the radiated pulses and any echoes thereof, which may be received from any distance within the range of the equipment, all in space sequence on the viewing screen corresponding to the time sequence in which the pulses are received.

Its ray is deflected horizontally across the viewing screen in a fixed path and in the time interval when the desired pulses are received, this time interval corresponding to the range of the equipment. It is deflected vertically from this path by the radiated pulse and by each of its echoes at respective points in its path corresponding to the distance from which the echo is received.

It is provided with a pair of switches 46 and 46' for adjustment of the range scale. When the switches 46 and 46' are in their left hand position, the range may, for example, be 25 miles and the indication may be that indicated in the circle 47 shown just above the C. O. indicator. This indication comprises a vertical deflection 48, which may be produced by the outgoing pulse, and any echoes which are received from remote objects within the range of 25 miles, one such echo being represented by the deflection 49. When the switches 46 and 46' are at the right, the control operator's indicator indicates all echoes received from a distance of 100 miles and the indication may be that represented in the circle 50 shown above the C. O. indicator. In this circle the radiated pulses are represented at 48' and one echo is represented at 49' and another at 53. The deflection 49', which may be produced by echoes from the same remote body, which produced the deflection 49 indicated in the circle 47, is spaced closer to the indication of the radiated pulse in the circle 50 than in the circle 47 because of the difference in range; that is, in the circle 47 the echoes indicated are more widely spread out than in the circle 50.

The square-shouldered deflection 54, shown in both circles, and at the top of which the deflections 49 and 49' appear, is produced by a so-called "aperture" pulse generated in the equipment and mixed with the received echo pulses in the mixer 40 previously referred to. These pulses are generated in equipment 55 (Fig. 2) and are supplied to the mixer 40 over conductor 56. The aperture pulse is controlled as to its time of occurance with respect to the radiated pulses by a low frequency phase shifter 57, which is adjustable to set the time when the aperture pulses occur after each radiated pulse whereby the square-shouldered deflections 54 may be manually moved along the horizontal indication shown in the circles 47 and 50 to a position such that it embraces, or brackets, any particular desired echo deflection which it may be desired particularly to observe, and it marks, or identifies, that particular echo, causing it to stand out on the screen among any other indications that may be present. These aperture pulses may have a length of about six microseconds where the radiated pulses are of one microsecond duration.

The range indicator 39 operates only during the aperture pulses. The aperture pulses are also supplied to the mixer and clipper 35, which is incapable of reproducing in its output any of the pulses received from receiver 34 except during the time of the aperture pulse. This mixer supplies this aperture pulse and any pulses from receiver 34, which occur during the aperture pulses, to the control electrode 38 of the range indicator. The aperture pulses then turn on the ray of that device during the period of the aperture pulse and its intensity is increased in accord with any echoes occurring during the aperture pulse.

These aperture pulses are also converted in equipment 58 of Fig. 2 to waves of the sawtooth form indicated at K and are supplied by means of amplifier 59 between the horizontal deflection plates of the range indicator whereby the ray of that device is deflected throughout the entire width of the viewing screen of this device during the short interval of these aperture pulses represented at 54. Any pulse, such as an echo, received from receiver 34 and mixed with the aperture pulse on control electrode 38 intensifies the ray at the particular time in its deflection when the pulse is received and thus a particular part of the horizontal illuminated line produced by the ray is brightened in accord with the echo as indicated by the heavy portion 60 of the indication shown in the circle 63 above the range indicator. Of course, one, two, or more such illuminated spots may appear where echoes are received from different objects near each other in range.

Further pulses are generated in the equipment, known as target marker pulses, and are supplied between the vertical deflection plates of the range indicator to produce the inverted V-shaped deflection which is shown in circle 63 as coinciding with the more illuminated spot 60. The time of occurrence of these target marker pulses is varied synchronously with the time of occurrence of the aperture pulses and thus the inverted V-shaped deflection occurs at a substantially fixed position on the viewing screen. By such synchronous adjustment of the aperture and target marker pulses the latter may be made to coincide in time with any received echo, and thus the bright spot 60 produced by the echo may be bisected on the viewing screen by the inverted V-shaped deflection produced by the target marker pulses, as illustrated. The range to the remote object from which the echo is received may be then determined from the adjustment of the means by which the time of occurrence of the target marker and aperture pulses is varied. This range may be read from the scale 101 of Fig. 2.

The equipment represented within the rectangle 13 of Fig. 1 comprises equipment which responds to that one of the echoes which coincides in time with the target marker pulses as indicated by the range indicator and automatically controls the time of occurrence of the aperture and target marker pulses to maintain the target marker pulses in coincidence with a particular received echo, and the bright spot 60 in coincidence with the inverted V, continuously and automatically notwithstanding any movements of the distant object from which the echo is received.

The equipment represented by the rectangle 15 of Fig. 1, as will later be described, comprises equipment which responds to the particular echo which coincides in time with the target marker pulses for automatically maintaining the radiating system 20 and 21 directed at the remote object during its movements. Of course, the remote object may be an aircraft flying at a distance and invisible by reason of darkness, distance, clouds, and other atmospheric conditions. This equipment maintains the axis of the parabola 21 directed at such remote object during its movements, both in elevation and azimuth, relative to the equipment illustrated.

To describe in greater detail the structure and operation of the equipment, I will refer to the curves A to M' of Fig. 3, which represent certain of the wave forms involved in the operation of the equipment. These curves are all plotted on the same time base and in two columns respectively designated "First cycle" and "Second cycle" to represent different time intervals spaced apart in time as indicated by the dotted portions of each of the curves.

At 70, in Fig. 2, is indicated a generator of oscillations having a constant high frequency, which, desirably, may be about 82 kilocycles. One cycle of the oscillations produced by this generator thus has a period equal approximately to 12 microseconds, and to the time required for a radiated pulse to travel to a remote reflecting surface one nautical mile away and return. These oscillations are indicated at A in Figs. 2 and 3. They are supplied through a limiter 74, which converts them to square wave form, as indicated at B in Figs. 2 and 3, and these square wave oscillations are supplied to a mixer 75.

Additional negative square wave pulses, as indicated at D in Figs. 2 and 3, are supplied to this mixer from a generator 76. These negative pulses may have a duration, as, for example, 25 microseconds, equal to two or three, or other small number of cycles of the wave A, and occur at the recurrence frequency of the pulses to be radiated. The minimum duration of these pulses must be slightly greater than the period of the 82 kilocycle wave. This generator 76 may be any suitable multivibrator operating at the frequency of which the pulses are to be radiated and may be variable in frequency either by purposeful manual adjustment to vary the frequency of the radiated pulses, or they may be subject to undesired variations in frequency, as due to extraneous influences such as temperature variations or variations in the operating voltage which may be supplied thereto. While it does not require any synchronization from other sources, it may, if desired, where a suitable constant frequency synchronizing source is available, be synchronized therefrom. I have indicated at 77 a terminal over which synchronizing voltage may be supplied, such voltage being, for example, of the form C in Figs. 2 and 3.

Frequently it is desirable that the frequency at which the transmitted pulses are radiated be varied to avoid interference due to other pulse equipment operating in the neighborhood and which may operate at about the same pulse rate. At the same time it is desirable that the pulses be emitted at a fixed time in the period of wave A, since, as will presently be explained, such operation increases the accuracy of measurement of the time interval between the radiated pulses and the particular echo thereof which coincides in time with the target marker pulses. Accordingly, the pulse frequency of source 76 is variable as indicated by the arrow, and these pulses are used to control the frequency of the radiated pulses.

The pulses from the 25 microsecond multivibrator 76 and the 82 kilocycle square wave pulses from the limiter 74 are mixed in the mixer 75 producing a wave such as indicated at E in Figs. 2 and 3, the pulses of wave E produced by the wave B during the negative pulses of the generator 76 appearing at 79 above, or superimposed upon, those produced by the negative pulses of the wave D.

This wave E is supplied through a clipper 78, which is incapable of passing current except during the pulses 79, which occur during the negative pulses of the wave D. Thus, the square pulses of the wave B are reproduced in the output of the clipper in groups of two or three, or other small number, the groups occurring at the frequency of and during the negative pulses of the wave D as indicated at F in Fig. 3. These pulses are supplied to a differentiator 80 by which they are converted to the wave form G as indicated in Figs. 2 and 3. The wave G is supplied to a clipper 83, which is incapable of passing current except during those pulses of the wave G, which exceed a predetermined intensity represented by the dotted line 84 in Fig. 3. Those pulses which exceed the intensity represented by the line 84 are supplied to a multivibrator 85, which generates negative square pulses having the frequency of the pulses to be radiated, and having a duration corresponding to the 25 mile range of the equipment, i. e. 300 microseconds. They are indicated at H in Figs. 2 and 3.

These 300 microsecond pulses are supplied through buffer amplifier 90 and over conductor 93 to the transmitter 33 where they synchronize the radiated pulses, each radiated pulse being produced after a small fixed interval following initiation of each negative pulse of wave H, and being of about one microsecond duration.

They also control the blanking and sweep voltages for the C. O. indicator and the time in the wave A with reference to which the occurrence of the aperture and target marker pulses, which control the range indicator, are variable, as will presently be indicated. It is important, therefore, that the initiation of these negative pulses of the wave H be rigidly controlled as by the constant frequency oscillator 70 the frequency of which may be controlled by a piezoelectric crystal, and that they be initiated at a fixed point in the cycle of those oscillations. It is also important that the initiation of these negative pulses of wave H be independent of any variations in the time of occurrence of the negative pulses of the wave D.

It may be ascertained from curves E, F, G and H of Fig. 3 that these negative pulses of wave H are initiated at a fixed point in the cycle of the 82 kilocycle wave A, this point being the termination of the first positive pulse 79 of wave E having duration sufficiently great that when differentiated it produces a corresponding positive peak 86 in wave G of intensity greater than that indicated by the dotted line 84.

The first pulse 79 of the wave E is, as illustrated in the "First cycle" column of Fig. 3, of shorter duration than later pulses 79. This is because the negative pulse of the wave D happened to start at an intermediate period of a negative pulse of the wave B. Upon differentiation this first pulse 79 produces a peak 86 in the wave G, which is not so intense as are the subsequent peaks 87 produced by termination of the later longer pulses 79 of the wave E. This peak 86, however, is of intensity greater than the intensity represented by the line 84 and produces a negative pulse in the output of the clipper 83 which synchronizes the generator 85 and causes the initiation of one of its negative pulses.

Of course, this first pulse 79 may be of any duration between zero and the full width of a pulse of the wave B. If the first pulse 79 had been somewhat shorter than shown in the "First cycle" column of Fig. 3, the corresponding first peak would fall below the line 84. In that event, the start of the wave H would be delayed until the next peak 87. In the "Second cycle" column of Fig. 3, the first pulse 79 is indicated as of the full width of a half cycle of wave A. The first peak 86 will, therefore, be of the same intensity as the full intensity of the subsequent peaks 87.

It will exceed the intensity represented by the line 84, in which case this pulse has a synchronizing effect upon the multivibrator 85 and the multivabrator 85 produces its negative pulse beginning at the time of peak 86 and is immune to succeeding pulses 87.

It will also be observed that the negative pulses of the wave H are initiated only upon termination of positive pulses 79 of the wave E. The changes in voltage of wave E corresponding to the beginning, or leading edge, of the positive pulses 79 have no effect upon wave H because upon differentiation they produce the negative peaks 89 of the wave G, which negative peaks are removed by clipper 83, and have no effect upon the multivibrator 85. This is important because the first positive peak 79 may start at any time at which both waves B and D are in a negative portion of their cycles simultaneously and thus the time of occurrence of the start of the first positive pulse 79 is subject to all the variations in the time of starting that the negative pulses of wave D are subjected to.

By limiting the starting of the negative pulses of wave H to termination of the first pulse 79 of sufficient duration to produce a positive peak in wave G greater than the predetermined value represented by line 84, the variations with respect to wave A in the time of starting of the negative pulses of wave D are removed, and each negative pulse of wave H starts at a fixed point in the cycle of constant frequency wave A. At the same time, the frequency of wave H and the radiated pulses is variable with variation in frequency of wave D.

The negative pulses of the wave D thus determine an epoch of time during which the negative pulses of wave H may be started, the starting being at a fixed point in the cycle of wave A during this epoch. This epoch is short, being two or three, or other small number, of cycles of wave A but may be variable length, if desired, as indicated by the dotted lines of curve D. These pulses D may therefore be referred to herein as "epoch" pulses.

Of course, if desired, the pulses H may be produced by a suitable chain of multivibrators generating subharmonics of the 82 kilocycle wave. The system described, however, in which the 82 kilocycle wave is combined with the epoch pulses from the generator 76, which may be a multivibrator of simple construction, in the manner explained is far cheaper and less expensive to provide and possesses the advantage that the frequency of the radiated pulses, which are determined by the frequency of the epoch pulses produced by generator 76, may readily be varied by varying the frequency of the generator 76 and that undesired variations in this frequency, or in the duration of the pulses produced thereby, produce no objectionable effects.

The pulses H control the horizontal sweep and blanking voltages of the C. O. indicator when adjusted for the 25 mile range. They are supplied through buffer amplifier 95, switch 46 in its left position, and amplifier 17 to the control electrode of device 45 with polarity to turn the ray of that device on during the 300 microsecond negative pulses of wave H.

They are also supplied to a low frequency phase shifter 57, which includes means whereby they are converted to sawtooth waves of the form indicated at I. These sawtooth waves are supplied through a buffer amplifier 94 and switch 46' in its left hand position and amplifier 18 to the horizontal deflection plates in the cathode ray device 45.

The sawtooth pulses I have a rising portion equal to the duration of the 300 microsecond negative pulses H, and they thus produce the horizontal deflection of the ray of the cathode ray device across the screen in 300 microseconds or the time required for a pulse to travel to a remote surface 25 miles away and return.

The wave H also synchronizes the blanking and sweep voltages of the C. O. indicator, which are generated and supplied to the C. O. indicator when switches 46 and 46' are adjusted to the right for the 100 mile range. It is supplied to a 1200 microsecond pulse generator 96, which is synchronized by the wave H, and produces square wave pulses, indicated at M in Fig. 3, which are supplied through the switch 46 and buffer amplifier 17 with polarity to turn the ray on during a 1200 microsecond interval beginning upon initiation of each negative pulse of wave H and hence beginning just prior to each radiated pulse. This wave, as applied to the control electrode of device 45, is as indicated at M' in Fig. 3.

The square wave pulse produced by the generator 96 is also converted to a sawtooth wave in the 1200 microsecond sweep generator and buffer 97 and supplied through switch 46' and amplifier 18 to the horizontal deflection plates of the C. O. indicator. The output of the sweep generator 97 is indicated at L in Figs. 2 and 3.

The wave H, which is supplied to the low frequency phase shifter 57, also controls the aperture pulse generator 55, which generates the aperture pulse J as shown in Figs. 2 and 3. This aperture pulse may have a duration of 6 microseconds corresponding to a range of one half mile and by variation of the low frequency phase shifter may be caused to occur at any time during the negative pulses of the wave H. It may be made to agree in time with the radiated pulses or to occur any time thereafter within the 25 mile range of the equipment. This aperture pulse, as previously explained, is supplied over the conductor 56 to the mixers 35 and 40 where it is mixed with the received signal and supplied from mixer 35 to the control electrode 38 of the range indicator where it turns the ray on for the duration of the aperture pulse, and from mixer 40 to the vertical deflection electrodes of the C. O. indicator where it produces the indication represented by the square-shouldered deflection 54.

This aperture pulse is converted by the aperture sweep generator 58 to a sawtooth wave K having rising portions of the same duration as the aperture pulse. This wave K is supplied through the amplifier 59 to the horizontal deflection electrodes of the range indicator. Thus, the ray of the range indicator is deflected across the full width of the screen during the 6 microsecond period of the aperture pulse and is extinguished at all other times.

The target marker pulses, above referred to, and which produce the inverted V-shaped deflection shown coinciding with illuminated spot 60 on the range indicator, are generated in the equipment represented at 100, 103, 104 and 105 of Fig. 2. The oscillations A from the generator 70 are supplied to the equipment 100, which is adapted to vary the phase of these oscillations synchronously with the variations in time of occurrence of the aperture pulse. For this purpose this high frequency phase shifter 100 is mechanically geared with the low frequency phase shifter 57, as indicated by the dotted line 106, the phase being varied through 360 degrees, or 12 microseconds, or one mile, with each shift of the aperture pulse by 12 microseconds, or one mile.

The output from this high frequency phase shifter 100, which may be of any desired type, is supplied through a limiter 103 whereby it is converted to a square wave B' (Fig. 9) and supplied to the target marker generator 104. This generator operates to generate a pulse which is shown in Fig. 10 and which is very brief relative to the period of a half cycle of the wave B', this pulse occurring at a fixed period in the cycle of the wave B'. These pulses are supplied through the buffer amplifier 105 to the vertical deflection plates of the range indicator and produce the V-shaped deflection indicated in the circle 63.

Thus, the high frequency phase shifter 100 and the low frequency phase shifter 57 may be varied synchronously until the spot on the viewing screen of the range indicator of brighter illumination produced by the echo agrees with the V-shaped deflection produced at the center of the screen of the cathode ray oscillograph. When this occurs, the target marker pulses agree in time with the received echo and the range to the remote object producing the echo may be determined from the adjustment of the mechanical adjusting means 106 which controls the high frequency phase shifter 100 and the low frequency phase shifter 57. This range may be read from a suitable calibrated scale 101 with which index 102 cooperates. This index is geared to the low and high frequency phase shifters. This range may also be transmitted to any desired remote point by suitable position transmission or telemetering equipment 111 connected and arranged to transmit the position of index 102 over cable 12.

The character of the circuits and instrumentalities represented in the rectangle 4 of Fig. 2 are illustrated in greater detail in Fig. 4 and may be described by reference to the curves of Figs. 3 and 5 to 12. The curves of Figs. 5 to 10 are drawn with reference to the same time base, as are also the curves of Figs. 11 and 12.

Near the center of the left hand side of Fig. 4 is represented the 82 kilocycle oscillator 70. The output from this oscillator is supplied through the limiter 74 to the control electrode of an electron discharge device 108. The limiter 74 converts these oscillations to the square wave oscillations shown at B in Fig. 3. The epoch pulses D produced by the generator 76 are supplied to the control electrode of a further electron discharge device 109. These discharge devices 108 and 109 may be of the usual screen grid and suppressor grid type and their anodes are connected together and through a resistance 110 to the positive terminal of a source of anode operating potential 113. These two devices form the mixer 75 of Fig. 2. The negative epoch pulses of wave D reduce the anode current in device 109 thereby producing a rise in the anode voltage on both devices. The negative pulses of wave B also produce rises in voltage on these anodes, and those which occur during the negative pulses of wave D produce rises to higher positive potential with respect to the cathodes of devices 108 and 109 than do negative pulses of the wave B which occur during positive pulses of the wave D. Thus, the wave E having the raised positive pulses 79, previously referred to, appears on these anodes.

This wave E is supplied through condenser 114 to the control electrode of the discharge device 115, which electrode is connected to the cathode through grid resistor 116 and cathode bias resistor 117. This device is biased to be non-conductive except during those positive peaks of the wave E which exceed the line 84′ of Figs. 3 and 4, and thus the output of the device 115 comprises a series of groups of negative pulses F, one for each negative epoch pulse of the wave E.

These groups of pulses F are supplied to the differentiating circuit comprising condenser 118 and resistance 119 whereby sharp pointed pulses corresponding to the wave G of Fig. 3 appear upon the resistance 119 and are supplied to the control electrode of the device 120. This device passes current only in response to the peaks of the wave G which exceed the line 84 of Fig. 3. These positive peaks produce a drop in voltage in resistance 123, and synchronize the multivibrator 124. This multivibrator operates to generate the wave H on one anode 125 of the multivibrator. This wave H is supplied through the buffer amplifier 95 to the left hand contact of switch 46, as shown in Fig. 1, to provide blanking of the C. O. indicator when adjusted for the 25 mile range.

The voltage on the other anode 126 of the multivibrator 124 is supplied to the control electrode of an amplifier 127, synchronizing a 1200 microsecond multivibrator 96 which generates square wave pulses having a duration of 1200 microseconds. This 1200 microsecond pulse wave is indicated at M in Figs. 3 and 4. It is supplied through the buffer 128 to the right hand contact of the switch 46 to provide blanking of the C. O. indicator when adjusted for the 100 mile range.

This wave M is also supplied to the 1200 microsecond sweep generator 97, which comprises a gaseous discharge device 130 and a highly evacuated discharge device 133. These two devices are connected in parallel across a source of operating potential 134 through a resistance 135 and they are shunted by a condenser 136. The gaseous discharge device 130 also has in its anode circuit a further resistance 137. The pulse wave M is supplied through a condenser 138 to the two control electrodes through resistances 139 and 140, respectively, these control electrodes being connected through these respective resistances and an additional resistance 143 to the cathodes.

During the negative 1200 microsecond pulse of the wave M both discharge devices 130 and 133 are nonconducting and the condenser 136 charges from the source of potential 134 through the resistance 135 in a substantially linear relation with respect to time, the resistance 135 being high. At the end of the negative 1200 microsecond pulse both devices become conducting thereby rapidly discharging condenser 136 through the low impedance of the gaseous device 130.

Were it not for the device 133, when condenser 136 is sufficiently discharged, device 130 would become nonconducting and the condenser 136 would again begin to charge. This is prevented, however, by the positive pulse 145 of the wave M which maintains the control electrode of device 133 positive thereby maintaining a low fixed impedance across the condenser 136. Thus, the condenser 136 assumes a fixed charge which is maintained during this interval 145, and each linear rising portion of the sawtooth wave generated starts with a definite fixed voltage. This positive portion of the waves is also effective on the grid of gas device 130 to maintain its impedance low after ionization ceases by reason of low anode voltage. This wave is indicated at L in Fig. 3. This sawtooth wave is supplied to the horizontal deflection electrodes of the control operator's indicator when the switch 46—46′ is at the right for operation over the 100 mile range.

It is important that each rise in the sawtooth wave on condenser 136 start with a fixed value of voltage because it is this fixed value of voltage which determines the starting point of the horizontal deflection of the cathode ray of device 45. If this value varies from cycle to cycle, the starting point of the horizontal deflection of the cathode ray varies from cycle to cycle and the vertical deflections produced by echoes become blurred and the indications are thereby impaired or destroyed. This generator 97 maintains this starting voltage fixed irrespective of any variations in the length of the positive portion 145 of the wave M.

This operation is important because of the variations in the frequency of the epoch pulse generator which may occur either due to manual adjustment, to undesired influences, or to variations in the time relation between waves B and D which may occur because of the relation between the frequencies of these waves. If the frequency of wave D varies or the time relation between it and wave B varies, the duration of the positive portion 145 of the wave M varies correspondingly, and it is necessary, therefore, that condenser 136 be discharged to a fixed value of voltage at a time sufficiently early in the period 145 of wave M to allow for any variations in the length of this period due to such variations, and so that the next charging of the condenser begins with the fixed value of voltage irrespective of such variations. In this way the starting point of the horizontal deflection of the cathode ray device remains fixed notwithstanding variations in the length of the interval 145 due to the variations in the epoch pulse generator. This is satisfactorily effected by the operation of the discharge device 133 as thus explained.

The wave H is also supplied to the low frequency phase shift 57 shown at the lower portion of Fig. 4. This low frequency phase shifter comprises an electron discharge device 150 the anode of which is supplied with positive potential from a source 153 which is shunted by a bleeder resistance 154, a tap of which is connected through inductance 155 to the anode of the device 150, the cathode being connected through a resistance 156 to the negative terminal of the source 153. The anode of this device 150 is also connected to the cathode thereof through two condensers 157 and 158 in series. It is also connected through a diode 159 and a resistance 160 to a variable tap on a resistance 163, which is connected across the source 153 through a further variable resistance 164.

During the negative pulses of wave H device 150 is nonconductive and condensers 157 and 158 charge linearly from source 153. During the positive portions of wave H device 150 is conductive and these condensers quickly discharge through device 150. Thus, a sawtooth wave I having linear rising portions having the 300 microsecond duration of the negative pulses of wave H is generated on condenser 158 and is supplied through buffer amplifier 161 and conductor 162 to the left hand contact of switch 46′ as shown in Fig. 2. It thus provides the horizontal sweep voltage for the C. O. indicator when switches 46 and 46' are adjusted for the 25 mile range.

Since condensers 157 and 158 are short circuited by device 150 immediately upon termination of each negative pulse of wave H, condenser 158 is discharged to a definite fixed value of voltage irrespective of variations in the duration of the positive pulses of wave H and, hence, irrespective of variations in the epoch pulse generator. Thus, the starting point for the horizontal deflection of the C. O. indicator is unaffected by variations in the epoch pulse generator when that indicator is adjusted for the 25 mile range just as was explained above when adjusted for the 100 mile range.

The aperture pulse is generated at a time in the rising portion of wave I which is variable in accord with the position of contact 165. During the first portion of the rise in voltage on the anode of device 150, represented by the dotted line 167 in Fig. 6, diode 159 is nonconducting since the potential on its anode is lower than that of contact 165. When the potential at the anode 150 exceeds the potential of the variable contact 165 on resistance 163, this diode becomes conducting and current starts to flow in resistance 160. The potential of contact 165 may be taken to be represented by the line 166 in Fig. 6, and it may be varied to any value in the rising portion of the wave I.

When current starts to flow in the diode 159, the cathode of diode 159 rises in potential by reason of drop in voltage on resistance 160. This rise in potential on the cathode of diode 159 produces a flow of current through condenser 170 and resistance 173 as indicated by the curve of Fig. 7. The potential on resistance 173 produced by this current is supplied between the control electrode and cathode of discharge device 174, which is rendered conducting, thereby synchronizing the aperture pulse generator 55, which may be of simple multivibrator type. This multivibrator produces six microsecond aperture pulses, as indicated by Fig. 8, which are supplied to the limiter and phase reverser 175, which, in turn, produces the aperture pulse wave J comprising 6 microsecond positive pulses on the control electrode of discharge device 176, as shown by Fig. 8, and it produces the same wave with reverse polarity on the conductor 177. This latter wave is designated —J in Figs. 1, 2 and 4. These later aperture pulses —J are supplied to the mixers 35 and 40 to be mixed with the received signal and thence applied to the control electrode of the range indicator and to the vertical deflection electrodes of the C. O. indicator, as previously described.

The positive aperture pulses J control the aperture sweep generator 58. This generator comprises the discharge device 176 and the diode 180. The anode of discharge device 176 is connected through a resistance 179 and diode 180 to the cathode of the device 176, and condenser 183 is connected between the anode of the diode 180 and the negative terminal of the resistance 178 the positive terminal of which is connected to the two cathodes.

Thus, when discharge device 176 becomes conductive during the aperture pulse, current flows in resistance 178 rendering the cathode of diode 180 positive with respect to its anode and interrupting current in the diode. Current then flows from the source of operating potential through resistance 179 into condenser 183 charging this condenser almost linearly since the resistance 179 is high. On termination of the aperture pulse, device 176 again becomes nonconductive, the potential on resistance 178 disappears, and the condenser 183 discharges through diode 180 and resistance 178 to a fixed value determined by the resistance of the path 180, 178. Thus a sawtooth wave is generated across the condenser 183 the rising portion of which occurs during the aperture pulse when the condenser charges. The condenser is then discharged quickly to its initial voltage, the discharge being entirely completed before the next rise in voltage occurs.

This sawtooth wave is amplified by the buffer amplifier 184 and supplied to the horizontal deflection amplifier 59 shown in Fig. 2 whereby it deflects the ray of the range indicator across the screen during the aperture pulse. Of course, since the discharge of the condenser 183 is completed before the beginning of the next aperture pulse, the ray of the range indicator is deflected from a fixed point on the screen during each aperture pulse and thus is unaffected by any variations in the epoch pulse wave D.

The target market generator is represented in the middle portion of Fig. 4 and comprises the high frequency phase shifter 100, which may be of goniometer construction having two stationary coils 193 and 194 positioned at right angles to each other and having a rotatable coil 195 arranged for rotation within the coils 193 and 194. Oscillations from the 82 kilocycle oscillator 70 are supplied to the coil 193 through buffer amplifier 196, and oscillations from the 82 kilocycle oscillator are supplied to the coil 194 through the phase shift network 197 and buffer amplifier 198. The phase shift network 197 produces a shift in phase of 90 degrees so that the coils 193 and 194 are energized in quadrature relation and produce a rotating field within them. Thus, the oscillations induced in the coil 195 have a time phase relation dependent upon the angular position of this coil within the coils 193 and 194. The opposite terminals of this coil are connected through respective slip rings 199 to the input of an amplifier and limiter 103 to which is supplied the wave A' of Fig. 9 having any time phase relation dependent on the position of coil 195 in rotation. This amplifier and limiter squares the 82 kilocycle oscillations, as indicated at B' in Fig. 9, and impresses them upon the control electrode of an amplifier 203. This amplifier is of any ordinary construction but is preferably of the screen grid and suppressor grid type and has in its anode circuit an inductance 204 and resistances 205 and 206, the intermediate point between resistances 205 and 206 being connected to ground through a large bypass condenser 207. The square wave oscillations B' are, of course, reproduced upon the resistance 205 the potential on which may be represented by the curve 208 of Fig. 11. The inductance 204 is of such value that it resonates with any inherent capacity that may be across the circuit at a frequency much higher than that of the 82 kilocycle wave, this capacity being represented by dotted lines at 209. Due to this resonance condition, a transient voltage is set up in response to each change in current in the anode of device 203, this transient being represented by the curve 210 of Fig. 11.

The square wave 208 and its oscillatory transient 210 are supplied to the path comprising condenser 213, resistance 214 and condenser 215, the latter of which may bypass a source of bias potential 216 for the discharge device 217. By reason of the operation of condenser 213 the voltage of the square wave 208 is not reproduced as a square wave on resistance 214 but rather appears thereon in the form of the wave represented by the curve 220 in Fig. 12; that is, when the current is minimum in the device 203, its anode is at high positive potential and the condenser 213 assumes a certain charge, from the source of anode operating potential through resistances 206, 205 and 214. During a positive pulse on the grid of device 203, current increases in the anode causing condenser 213 to discharge to a certain extent through resistance 214. This discharge current decreases at an exponentially decreasing rate and produces a voltage on resistance 214 represented by the portion b of the curve 220 of Fig. 12. During the negative portion of the square wave, the current drops in device 203 and its anode potential rises. Condenser 213 then charges at an exponentially decreasing rate and current flows in resistance 214 in accordance with the portion a of the wave 220 of Fig. 12. Thus the cycle repeats.

It will be seen that the portions a and b of the wave 220 are very steep and that the transient oscillation previously mentioned is superposed on this steep wave. However, because of the steepness of the portion a of the wave 220, the first positive swing 222 of the transient cycle extends to a much higher voltage than does the second positive swing 223, the difference in the peak values of these two positive swings being substantially greater than is the case in Fig. 11. This voltage is supplied between the grid and cathode of device 217, which is biased by battery 216 to be nonconducting for any voltages applied to the grid thereof of value less than the positive value represented at C in Fig. 12. Thus in the anode circuit of device 217, only pulses of current such as those indicated at 224 in Fig. 10 appear, these pulses occurring just after the zero point of the 82 kilocycle waves A' and B' as shown in Fig. 9. These pulses comprise the target marker pulses of Figs. 1 and 2 and, of course, they are shifted in their time phase relation with respect to the wave A by variation of the position of the rotor coil 195 of the high frequency phase shifter 100. These target marker pulses are supplied over transmission line 218 to the vertical deflection plates of the range indicator.

The coil 195 is geared to be rotated synchronously with the movement of contact 165 of the low frequency phase shifter, this mechanical interconnection being indicated by the dotted line 106 and the rectangle 106', which may be taken to represent gears of a proper ratio. The movement of the contact 165 throughout the length of resistance 163 varies the time of occurrence of the aperture pulse J of Fig. 3 throughout the duration of the negative portion of the wave H and throughout the horizontal rising portion of the wave I, these intervals being the 300 microsecond intervals corresponding to a range of 25 miles. The gear ratio of the gear mechanism 106' should be such that the coil 195 rotates through 25 revolutions while contact 165 moves through its range of movement. Thus the phase of the oscillations in coil 195 is varied through 25 periods or through 300 microseconds as the aperture pulse is shifted through the range of 300 microseconds. In this way one target marker pulse always occurs at a substantially fixed time in the aperture pulse and thus the inverted V-shaped deflection shown in the circle 63 and produced by the target marker pulses always occurs at a substantially fixed point on the fluorescent screen of the range indicator.

The operator, upon observing a particular deflection on the indicator 45, which he may recognize as that of a remote moving object, for example, and the movement of which he desires particularly to observe, may rotate the shaft 106 until the square-shouldered deflection 54 produced by the aperture pulse brackets the particular deflection 49 to be observed. The range indicator then indicates by the bright spot 60 on its fluorescent screen that particular echo. The shaft 106 may then be more accurately adjusted by observation of the range indicator until the bright spot 60 is bisected by the vertex of the inverted V-shaped deflection. The range may then be accurately read from the position of the index 102 on the calibration 101.

As previously indicated, it is necessary that the starting point of each horizontal deflection of the ray of the indicators 30 and 45 be maintained fixed notwithstanding variations in the duration of the positive portion of the waves H, which may be produced by irregularities in the epoch wave D, as by reason of change in frequency thereof. Variations in the duration of the positive portions of wave H may also be caused by change in the relationship between the epoch wave D and the wave B. The starting point of the negative pulses of the wave H may shift abruptly from time to time through a range of 12 microseconds or one cycle of the wave B by reason of the change in relationship between the waves B and D which occurs from time to time. Thus the period of one cycle of the waves H to M' may at one time be 12 microseconds longer than the period of the next following cycle. Since the period of the negative pulses of waves H and M are fixed in the multivibrators which generate them, this 12 microseconds variation appears in the positive pulses of these waves. It also appears in the negative pulses of waves H', I, J, K, L and M'. It thus occurs in the periods between the sawtooth pulses of waves I, K and L, that is, in the retrace periods of the ray of the respective cathode ray devices. For this reason the waves I, K and L are formed as indicated, each wave rising linearly during the fixed period and then dropping as rapidly as possible to the initial value at which it remains throughout the interval between the sawtooth pulses. This drop must be entirely complete before the next linear rise of the sawtooth wave begins.

This shaping of the wave is adequate in connection with the wave K, which is supplied to the horizontal deflection amplifier 59 of the range indicator, because the sawtooth pulses are of but 12 microsecond duration. In the case of waves I and L, however, in which the sawtooth intervals comprise a much larger portion of the entire period of the wave, these effects produce a change in the effective alternating current axis of the respective wave. This change in effective axis operates, when the wave is supplied through the coupling condensers of the deflection amplifier, to shift the position of the starting point of the horizontal deflection. It is therefore necessary to employ direct current insertion means in the horizontal amplifier 18 to eliminate this effect.

This direct current insertion means is shown in Fig. 16. This Fig. 16 illustrates an amplifier 230 between the grid and cathode of which the sawtooth wave, which may be the wave I or L of Fig. 3, is impressed. This wave is, of course, amplified by the amplifier and appears with reverse polarity on the anode of the amplifier 230. This anode is coupled through a condenser 233 to one of the horizontal deflection plates 234 of the cathode ray device 45. The electrode of condenser 233 adjacent the cathode ray device 45 is connected through a diode 235, which is shunted by a high resistance 236, to a variable tap on a potentiometer 237. The anode of amplifier 230 is supplied with operating potential from a source 238 through resistance 241. The positive terminal of source 238 is connected to one terminal of the potentiometer 237 and the negative terminal is connected through a second source 239 to the opposite terminal of the resistance 237, the two sources 238 and 239 being in aiding relation across resistance 237.

Were it not for the diode 235, due to condenser 233, the point 242 would oscillate about the zero axis of the alternating wave I or L, this value being represented by line 243 in Fig. 16 and being fixed by the position of contact 240. Thus if the peak value x, which varies with the average value of the wave, changed, the starting point of the deflection would change.

Diode 235 operates as a peak detector producing a bias voltage on resistance 236 equal to the peak value of the wave and changing with this peak value. Thus point 242 is biased from the voltage at contact 240 by this bias voltage which changes with the value of the negative peak of the wave applied to device 230, and the oscillations at point 242 are about a bias voltage which varies as the negative peak values of the wave change. Stated in other words, during the negative peaks of the wave I or L, the instantaneous voltage on resistance 236 is made zero by the diode 235, thereby fixing the starting point of the deflections irrespective of any variations in peak amplitude of the impressed wave.

It may be desirable that the horizontal deflection amplifier 18 be of push-pull form in which case the wave I, or L, as the case may be, is impressed between the control electrode and cathode of a second amplifier 244, through suitable polarity reversing means, not shown, with opposite polarity to that applied to the amplifier 230. This amplifier is connected in exactly the same way with respect to diode 245 and resistance 246 except that diode 245 is reversed in the circuit. The anode of the diode 245 is connected to variable contact 247 on potentiometer 248, which is connected in parallel with the potentiometer 237, and the contacts 240 and 247 are mechanically connected together for unicontrol as indicated by the dotted line 249, the relative movements being such that one approaches a more positive terminal of the resistance as the other approaches the more negative terminal. This control effects the centering of the cathode ray deflection on the viewing screen of the cathode ray device.

Since the negative pulses of the wave H are each initiated at a fixed point in the period of the 82 kilocycle wave A, the short wave pulses radiated by the antenna, being synchronized thereby, occur at a fixed point in the period of the 82 kilocycle wave A. The radiated pulses may be of about one microsecond duration or short relative to the period of the 82 kilocycle wave. The target marker pulses, which are short relative to the 82 kilocycle wave and occur at a fixed time in the period of the 82 kilocycle wave at the output of high frequency phase shifter 100. Shaft 106 may be so adjusted that the radiated pulse itself, rather than its echo, produces the bright spot 60 on the range indicator. Then when this bright spot 60 is intersected by the inverted V, the radiated pulses and target marker pulses occur simultaneously. The index 102 may then be set in a position on scale 101 reading zero. The radiated pulse may occur at a fixed time sufficiently later than the beginning of the negative pulse of wave H to permit this coincidence of the radiated pulse and target marker pulses.

Shaft 106 may now be moved to delay the phase, or time of occurence, of the target marker and aperture pulses with respect to the radiated pulses. As this is done the bright spot 60 moves to the left on the range indicator until the delay amounts to about three microseconds, or ninety degrees of the wave A when the spot 60 moves off the screen. This delay may be increased through twenty-five cycles of the 82 kilocycle wave A by rotation of shaft 106 through its twenty-five revolutions. When it has been so delayed that an echo of the radiated pulse is received in the six microsecond period of the aperture pulse, the illuminated spot appears on the range indicator coming from the right. Upon adjustment of the delay until the echo agrees in time with the target marker pulses, the illuminated spot produced by the echo is bisected by the inverted V on the range indicator. The index is then at a position on the scale corresponding to the number of periods of wave A between the radiated pulse and its received echo.

Thus this scale 101 may be calibrated in terms of such number of periods or in terms of the time interval in microseconds between the radiated and received pulses, or in terms of yards or miles to the remote object from which the echo is received. This calibration is accurate irrespective of any variations in frequency of the radiated pulses since a change of that frequency does not in any way affect either the 82 kilocycle frequency or the point on wave A where the transmitted pulses are radiated.

The mechanism thus comprises means whereby both the radiated pulse and its received echo may be related to fixed positions on the 82 kilocycle wave and the index 102 produces an indication in accord with the number of cycles, or degrees, of the 82 kilocycle wave between these two positions. This indication may be in terms of units of time, distance or degrees as desired.

Thus the 82 kilocycle wave is employed in the equipment as a yardstick for measuring range, the space markings on the yardstick corresponding to the period of the high frequency wave. The zero point of the yardstick is placed at the time of radiation of the transmitted pulse by adjusting the radiated pulse to coincide in time with the target marker pulse as indicated by the range indicator. The echo is then received at a time later corresponding to the number of periods of the 82 kilocycle wave, or the number of space markings on the yardstick in the interval between the radiated pulse and its echo as indicated on scale 101 when the echo coincides with the target marker pulses as indicated by the range indicator.

Of course, this method of adjustment of the zero position of the yardstick, that is, the adjustment to cause the radiated pulse to coincide in time with the target marker pulse, involves an error in range corresponding to the time required for travel of the pulses from the TR box of Fig. 1 to the antenna and return. This error may amount to one or two hundred yards. A more accurate method of adjustment of the zero range position is to receive an echo from an object of known range and cause that echo to agree with the target marker pulses. The index 102 is then set in a position corresponding to the known range from which the echo is received. The zero position of index 102 is then accurate although the radiated pulse may not exactly coincide with the target marker pulse as indicated by the range indicator, the discrepancy being the time delay in the circuits of the equipment itself.

Of course, since the radiated pulse, and hence its echo, is of about one microsecond duration and the aperture pulse about six microseconds duration, two or more echoes from different remote objects near together may produce corresponding bright spots on the range indicator. To be able to separate adjacent signals is desirable because it permits the more ready distinguishing of the echoes produced by moving objects from those produced by fixed objects such as a remote monument, or tower. The range indicator expands in space on its viewing screen the echoes received in a very brief interval, or aperture, of the whole time over which echoes are received to permit such more ready distinguishing of one echo from another, and to permit the fine adjustment required to determine with accuracy the distance from which a particular echo is received and to permit following the movements of an object producing such particular selected echo.

Of course, to follow the movement of such remote object by automatic operation of the equipment it is necessary that the particular echo which agrees in time with the target marker pulses be selected from the other echoes which occur during the aperture pulses. Equipment for effecting such selection and such automatic following is represented by the rectangle 13 of Fig. 1 and will be described by reference to the curves of Fig. 14.

Referring to Fig. 1, the 6 microsecond aperture pulse —J is supplied over conductor 56 to the mixer 250 where, in addition to being reversed in polarity, it is mixed with the wave B', which is supplied over conductor 253 from the output of the limiter 103 of Fig. 2. It will be remembered that this wave B' comprises the 82 kilocycle wave which has been squared by the limiter 103 and which may have any desired time phase relation with respect to wave A dependent upon the adjustment of the high frequency phase shifter 100. It has a substantially fixed phase relation with respect to the aperture pulse, however, since both are varied synchronously in response to rotation of the shaft 106. This phase relation is not rigidly fixed, however, since variations in the circuits of discharge devices 150, 151, power supply 153, or multivibrator 55 may affect, to some extent, the time of occurrence of the aperture pulse. This phase relation may be that indicated by the waves J and B' of Fig. 14. These two pulse waves are mixed in the mixer 250 to produce a wave of the form indicated at N in Fig. 14. This mixer may also include a limiter which is capable of passing only the portion of wave N above the dotted line 255 thereby to produce in the output of the limiter the wave represented at O in Fig. 14. The pulse 256 of this wave O may be of any duration between one and five microseconds but preferably is in the order of 2.5 microseconds, although it may be subject to some variation in the equipment. Its termination is in fixed relation with the period of the wave B'. This wave O is supplied to a one microsecond pulse generator 257 which generates the one microsecond pulse 258 shown in the wave Q of Fig. 14. This one microsecond pulse 258 of wave Q is initiated simultaneously with termination of the pulse 256 of wave O which, as was previously explained, has a fixed time relation with wave B'. Thus pulse 258 occurs in fixed time relation to the wave B' and variation in the phase shifter varies the time of occurrence of the pulse 258 in fixed constant time relation to the target marker pulses.

The target marker pulses occur during this pulse 258 since, as shown in Fig. 1, the wave B' is supplied to the target marker generator 104 which generates a target marker pulse 224, Fig. 10, just after the beginning of each alternate half cycle of the wave B' Fig. 9. These target marker pulses, as above described are the first peak 222, Fig. 12, of the transient oscillation 223 superposed on the wave B' by circuit 203, 204, 205, 209, of the target marker generator. Six cycles of this transient are shown in Fig. 12 during each half cycle of the 82 kilocycle wave B' which means that the period of this wave is about one microsecond or equal to the duration of the one microsecond pulse 258. Thus the first peak 222 of this transient, which is the target marker pulse, occurs within the short pulse 258 of wave Q and this pulse 258 may be taken as a short aperture bracketing the particular echo, the indication of which coincides with the inverted V produced by the target marker pulse on the screen of the range indicator. This short aperture, therefore, may be used, by means presently to be described, to select the particular echo received coincident with the target marker pulse, and that echo may be used to maintain the target marker pulse in coincidence with the echo during variations in the range from which the echo is received. This echo may also be used to control other equipment such as range indication equipment and the azimuth and elevation control mechanism for the antenna to maintain the antenna directed at the object from which the particular echo is received.

This short aperture pulse 258 of curve Q is supplied to a transient generator 259 which generates a transient oscillation as indicated by the oscillatory portion 260 of curve R of Fig. 14 but which is suppressed by the wave Q except for the duration of the one microsecond pulse 258 of the wave Q. Thus only the first cycle of this transient pulse is actually produced, this one cycle being indicated in full line on the curve R.

This one cycle oscillation indicated at 260 on the curve R of Fig. 14 is supplied to two mixers 263 and 264 where it is mixed with the echo which is received during the aperture pulse; that is, the aperture pulse with the echo pulse superposed thereon, which is the signal that appears at the output of the buffer 36 of Fig. 1, and which is represented by the wave S of Fig. 14, but with opposite polarity, is supplied through the phase inverter 265 by which it is reproduced with one polarity and supplied to the mixer 264 and with the other polarity and supplied to the mixer 263.

On the curve S of Fig. 14 the received echo is indicated by the inverted V-shaped portion 266 of the curve, as occurring equally in the two half cycles of the one cycle transient 260. The areas representing the two halves of the echo are oppositely shaded on the curve S. If this echo 266 agrees in time with the oscillation 260, then a wave of the form indicated at T is reproduced in the output of one of the mixers 263 and 264 and a wave form indicated at U is produced in the output of the other mixer. These two wave forms T and U are supplied to a differential integrator 267 where they combine to neutralize each other exactly and result in a direct current voltage of zero value indicated by the full line 270 in Fig. 14.

This neutralization occurs because the first part of echo 266 aids the first half cycle of the transient in one mixer and opposes it in the other. Thus first peak 272, as it appears in the output of one mixer 263, is increased by the same amount that the first peak 272 is decreased in the output of the other mixer. This is true with respect to the second half cycle of the one cycle transient, but in that case the second peak 273 is decreased in the one mixer as indicated by the curve U whereas the second peak 273 is increased in the other mixer. These two waves, when applied to the differential integrator, exactly neutralize each other and produce a zero direct current voltage in the output of the integrator.

If the moving object from which the echo 266 is received approaches the equipment described, then the inverted V-shaped portion 266 of the curve S may be advanced in time or moved to the left with respect to the time of occurrence of the one cycle transient 260. The result is that the area of the positive peak 272 in mixer 264 is increased still more and in the other mixer 263 the area of the negative pulse 273 is decreased. Thus a positive unidirectional voltage represented by the dotted line 275 in Fig. 14 is produced at the output of the integrator. If the remote object moves away from the equipment, then the echo 266 may move to the right with respect to the one cycle transient 260. If this occurs, the area of the peak 272 in mixer 264 is decreased more, whereas the area of the peak 273 in mixer 263 is increased by the echo, with the result that a unidirectional voltage of negative polarity as indicated by the dotted line 276 in Fig. 14 is produced at the output of the integrator.

These unidirectional voltages are supplied to a range drive system 278 which comprises a motor mechanism connected by the shaft 279 and suitable gearing to the shaft 106 whereby it drives that shaft in a direction dependent upon the polarity of the voltage in the output of the integrator 267 and thereby shifts the time of occurrence of the target marker and aperture pulses to maintain the one cycle transient 260 in agreement in time with the echo.

Thus the illuminated spot 60 is automatically maintained in position where it is bisected by the inverted V on the range indicator.

This equipment represented by the rectangle 13 in Fig. 1 is shown in detail in Fig. 13. In this figure the aperture pulse with negative polarity as represented by —J is supplied over conductor 56 to the control electrode of discharge device 280 in the mixer 250. The wave B' is supplied over conductor 253 to the control electrode of the discharge device 283 of the mixer 250. The anodes of these discharge devices are connected together through resistance 284 to the positive terminal of the source of operating potential 285. Thus the wave N of Fig. 14 is produced on the anodes of the two devices 280 and 283 and is supplied to the clipper or limiter 286. The anode of this device is connected through resistance 287 to the positive terminal of the source of operating potential 285 and the cathode thereof is connected to the negative terminal through the bias resistance 288, this latter resistance being of such value that no current flows in the anode of this device when the voltage applied to the control electrode is of a value below the value represented by the line 255 of the curve N in Fig. 14. Thus a current pulse represented at 256 in the wave O of Fig. 14 flows through the resistance 287.

This resistance 287 is shunted by an artificial transmission line comprising a series of inductances 290 and shunt capacities 300 and which is short circuited at its remote end 303. The constants of this line are so proportioned that one half microsecond is required for a voltage variation to travel from the resistance 287 thereof to its remote end 303, and thus one microsecond is required before any reflection of such variation from said short circuited end appears at the resistance 287. Since the line is short circuited at its remote end, a voltage exists on resistance 287 only during the one microsecond pulse prior to return of the reflection to the resistance 287 when voltage on resistance 287 disappears by reason of the short circuit produced by the line. Thus two one microsecond pulses are produced on resistance 287, one directly after the beginning of the pulse 256 and the other directly after termination thereof, these pulses being indicated at 304 and 305 of the curve P of Fig. 14, the first being of opposite polarity to the last.

This pulse wave P is supplied to the limiter 306, which is biased to be nonconductive to all values of voltage below the value represented by the line 307 on the curve P of Fig. 14. Thus a positive one microsecond pulse as indicated at 258 in the curve Q of Fig. 14 appears upon the cathode of device 306. This one microsecond pulse may be referred to as a second or narrow aperture pulse which is produced within the period of the longer six microsecond aperture pulse J. A negative pulse, —Q, appears on the anode of device 306 and is supplied through condenser 308 to the control electrode of the transient pulse generator 309. The positive pulse 258 is supplied over conductor 405 to equipment 15 later to be described.

The transient pulse generator 309 comprises an electron discharge device, which may be a triode, having its anode connected to the source of anode operating potential 285 through a resistance 310 and also connected through a condenser 313 and tuned oscillatory circuit 314 to the cathode thereof, the control electrode also being connected through a resistance 315 and the oscillatory circuit 314 to the cathode. The circuit 314 is tuned to oscillate at approximately 1,000,000 cycles per second, which is one cycle per microsecond, or one cycle during the one microsecond pulse 258. During the positive portion of the wave —Q, the control electrode of device 309 is positive and the device presents a low resistance across the oscillatory circuit 314 so that no oscillation occurs. When the negative pulse 258 of wave —Q occurs, however, the control electrode is driven negative sufficiently to interrupt current through the device, and the change in current in the inductance of the oscillatory circuit 314 excites a strong oscillation of the 1,000,000 cycle frequency therein, this oscillation being that indicated by the oscillatory portion 260 of the curve R of Fig. 14. On termination of the pulse 258 the resistance of the device 309 is greatly reduced, thereby damping the oscillations to the point of extinction so that only the first cycle of the oscillation occurs.

This damping effect is extremely effective since the oscillatory circuit is in a portion of the circuit common to the control electrode and anode circuits of the discharge device so that the mutual conductance of the discharge device is effective in reducing the resistance across the oscillatory circuit. In other words, the device is highly degenerative.

The lower terminal of the oscillatory circuit 314 is grounded and the potential on the upper terminal of the oscillatory circuit; that is, the potential on the cathode of the discharge device is supplied to control electrodes of the discharge devices 316 and 317 of the mixers 264 and 263, respectively. Each of these mixers 263 and 264 also includes a further discharge device 318 and 319, respectively, to which the aperture pulse and its superposed echo are applied in opposite phase. This aperture pulse is derived from the output of the buffer 36 of Fig. 1 where it appears as a pulse of negative polarity and is supplied over conductor 320 to the control electrode of discharge device 323 which operates as the phase inverter 265 of Fig. 1. This phase inverter has its anode connected through a resistance 324 to the positive terminal of the source of operating potential and its cathode connected through a resistance 325 to the negative terminal thereof so that the potentials on the anode and cathode vary in opposite phase. The anode is connected through a condenser 326 to the control electrode of the device 318 in the mixer 263 and the potential on the cathode of device 323 is connected through the condenser 327 to the control electrode of device 319 in the mixer 264. Thus the wave S appears on the control electrode of device 318 and the wave —S appears on the control electrode of the device 319.

Thus, the one cycle transient generated in circuit 314 is supplied in like phase to the two mixers, whereas the aperture and signal are supplied in opposite polarity to the two mixers.

The received echo may aid the first peak of the transient and oppose the second peak in one mixer and oppose the first peak and aid the second peak in the other mixer thereby producing the waves T and U on the anodes of the discharge devices of the two mixers 263 and 264.

These waves T and U are supplied across respective diodes 330 and 333 through condenser 334. These diodes and condenser 334 comprise the differential integrator of Fig. 1 and are poled oppositely and both diodes are biased to be non-conductive to potentials of a predetermined value. The diode 333 has its anode biased negatively with respect to the cathode from a potentiometer 335 connected across a source 336, and the diode 330 has its cathode biased positively with respect to its anode from a potentiometer 337 which is connected across the anode source of potential.

Thus let us assume that the wave T of Fig. 14 is supplied to the diode 333. This diode is nonconductive except when the potential exceeds the value represented by the line 338 on the curve T of Fig. 14. During the peak 272, however, current flows through the diode 333 and tends to charge the condenser 334. During this same half cycle, the peak 272 of the wave U is impressed upon diode 330, but this peak is of such polarity that no current flows in the diode. During the next half cycle, the peak 273 of wave T is supplied to the diode 333 but is of such polarity that no current flows in the diode. The peak 273 of wave U, however, is supplied to the diode 330 and causes current to flow therein when the voltage exceeds the value represented by the line 340 on the wave U of Fig. 14. This current, however, flows in the direction to discharge condenser 334. The result is that no net change in the charge on condenser 334 occurs so long as the echo is received equally during the two half cycles of the one cycle transient 260.

If, however, the peak 272 of wave T increases to an extent greater than the peak 273 of wave U, then the condenser tends to charge with voltage of one polarity. If the opposite effect occurs—that is, if peak 272 of wave T reduces while peak 273 of wave U increases—then the condenser tends to charge in the opposite direction. The result is that a voltage of one polarity or the other is developed on the condenser 334 in response to any shifting of the echo 266 of wave S in time with respect to the transient oscillation 260, that is, with respect to any movement of the inverted V portion 266 of wave S to the left or to the right of the one cycle pulse of the wave R.

This unidirectional voltage is employed to control the direction and extent of rotation of shaft 106. It is supplied to the control electrode of discharge device 281 which, together with discharge device 282, controls the magnitude and polarity of an alternating current voltage which is supplied through amplifier 251 to a motor 261 which in turn is connected to the shaft 279 geared, as previously pointed out, to shaft 106 thereby to maintain the target marker pulse in close agreement in time with the received echo.

The circuit comprising discharge devices 281 and 282 is described and claimed in my copending application Serial No. 468,406, filed December 9, 1942, now Patent No. 2,427,687, which issued September 23, 1947, entitled Pulse control systems and assigned to the assignee of my present application.

The motor 261 has a field winding 262 which is energized with alternating current from a source 268. This source also supplies alternating current through the phase shifter 289 and limiter 292 to the control electrode of discharge device 282. The limiter 292 converts the sine wave oscillations developed by the source 268 to oscillations of square wave form. The anode of discharge device 281 is connected to the source of unidirectional operating potential through resistance 293 and the anode of device 282 is connected to a tap 294 on this resistance. The cathodes of the two discharge devices are connected together and through a resistance 295 to the negative terminal of the source 285. The device 282 is of a type passing a larger anode current than device 281, and device 281 is self-biased by resistance 295 to operate on the linear portion of its anode current grid bias characteristic.

Normally when the potential on condenser 334 is zero, pulses of current flow in device 282 when its grid is positive, this current being interrupted when the grid is negative. This current flowing in resistance 295 biases that device to cutoff, to maintain the potential across resistance 293 constant during both half cycles of the alternating voltage supplied from limiter 272 to device 282; that is, the increase in potential on resistance 293 due to current flowing in the lower portion thereof and in device 282 is exactly equal to the reduction in potential on the whole of resistance 293 due to the reduction of current in resistance 293 produced by the current in diode 282. Tap 294 may be adjusted for this condition. The result is that no alternating component of potential is supplied through condenser 296 to the amplifier 251.

When the potential on condenser 334 is positive, however, the current in device 281 is increased and pulses of potential of one polarity are supplied through the condenser 296 to the amplifier, the pulses, of course, being of the frequency of the source 268. When the charge on condenser 334 is negative, then the current in device 281 is reduced and pulses of potential of opposite polarity are supplied through condenser 296 to the amplifier 251. Of course, the intensity of these pulses of current is dependent upon the magnitude of the charge in condenser 334. The result is that the motor 261 runs in one direction or the other depending upon the polarity of the charge on condenser 334 and at a speed dependent upon the magnitude of that charge.

It will thus be seen that the illuminated spot 60 is maintained in a position such that it is bisected by the inverted V-shaped deflection produced by the target marker pulses on the range indicator during any variations in range of the remote object whose echo produces the illuminated spot.

The unidirectional voltage on condenser 334 is also supplied to the vacuum tube voltmeter 291 which may be employed to indicate the voltage on condenser 334 and which thus indicates any discrepancy between the time of occurrence of the echo and the small aperture pulse, or any error in range. In initial adjustment of the equipment the potentiometers 335 and 337 are adjusted in the absence of signal to positions such that meter 291 indicates zero.

The target or remote object may move, however, not only in a direction changing its range from the equipment described but it may move in directions in train and in elevation. Accordingly, it is necessary that means be provided responsive to this same echo which occurs during this short aperture pulse, i. e., the one microsecond pulse 258, to maintain the axis of the parabola 21 directed at the remote object. This equipment is represented by the rectangle 15 of Fig. 1, and the details thereof are illustrated in Fig. 15. It will be described by reference to Fig. 15 and the curves of Figs. 14 and 17.

Referring to Fig. 15, the aperture pulse and echo which appear at the output of the mixer 35 of Fig. 1, in the form of the wave S, are supplied to the input of an electron discharge device 400, which is one of two discharge devices in a mixer 403. The wave Q, with its small one microsecond aperture pulse 258, derived from the cathode resistor 404 of discharge device 306 in Fig. 13 is supplied over conductor 405 to the input of a second discharge device 406 in this mixer 403. These two discharge devices 400 and 406 have their anodes connected together and through resistance 407 to the source of anode operating potential 285. Since the echo represented by the inverted V portion 266 of the wave S occurs during the positive pulse of the wave Q due to the action of the equipment 13, a wave of the form indicated at Y in Fig. 13 appears on the anodes of these two devices, this wave Y being the sum of the waves Q and S; that is, the positive pulses of the waves S and Q both tend to increase the currents in the respective devices 400 and 406 thereby producing a reduction in voltage on the anodes of these devices. Thus the long aperture pulse is reproduced in the portion 408 of the wave Y, the one microsecond aperture pulse of the wave Q is reproduced in the portion 409 of the wave Y and the echo is reproduced in the V-shaped portion 266' of the wave Y, the base of the V being displaced by a considerable voltage from the bottom of the pulse 408 of the wave Y.

This wave Y is supplied through a condenser 410 to a diode 413 which operates in connection with resistance 415 and condenser 416 both as a clipper and an integrator; that is, due to rectification of the wave Y by the diode, a voltage is developed in condenser 416 having a value which may be represented by the horizontal line 417 on the curve Y of Fig. 14. This voltage is poled to render the diode non-conducting except for voltages exceeding the value $y$ on the curve Y. This value $y$ of voltage is sufficiently great so that any other echoes which are received during the six microsecond aperture pulse and which are represented by dotted lines 418 and 419 on the curve Y, are not passed by the diode. Current flows in the diode only during the echo which occurs during the one microsecond pulse 258 of the wave Q and which is represented at 266' in the curve Y. The time constant of the condenser 416 and resistor 415 is such that this current maintains the voltage $y$ during recurrence of these pulses at their 500 to 800 cycle frequency. Thus a voltage is developed on the condenser 416 which may be represented by the curve 420 of Fig. 17. This curve represents a continuous direct current voltage of a value represented at 421 having serrations therein due to the alternate charging of the condenser 416 by the echo and its subsequent partial discharging through resistance 415 during the intermediate intervals.

If the axis of the parabola be directed through the object producing the echo, the value 421 of the voltage represented by the curve 420 is substantially constant. If, however, the object be to the right or to the left of the axis of the parabola, then the intensity of the received echo varies in a cyclical fashion at the frequency at which the antenna rotates; that is, it will be recalled that the beam of waves produced by the antenna system is not directed along the axis of the parabola but at a small angle thereto and that it is rotated about the surface of a cone the axis of which coincides with the axis of the parabola. When the axis of directivity of this beam is in a part of its rotation where it is directed most nearly at the remote object, the echoes are more intense, whereas at 180 degrees in its rotation from such position the echoes are least intense. Thus under this condition the voltage represented by the curve 420 varies cyclically as represented by the curve 422 in Fig. 17, the cylical variation having the frequency of rotation of the antenna. This cyclical variation in voltage is supplied from condenser 416 through condenser 423 to the control electrode of discharge device 424. The anode of this discharge device is connected through resistance 425 to the positive terminal of the source of operating potential and its cathode is connected through resistances 426 to the negative terminal of the source of operating potential. Thus these cyclical voltage variations are reproduced upon both the anode and cathode in opposite respective time phase relations, the voltage on the anode being supplied through the condenser 427 to the control electrode of discharge device 428 and the voltage on the cathode being supplied through condenser 429 to the control electrode of discharge device 430.

These discharge devices 428 and 430 have their anodes connected together through a resistance 433 the midpoint of which is connected to the positive terminal of the source of operating potential. The alternating potentials appearing on the opposite terminals of this resistance 433, which are in opposite phase but which correspond to the cyclical variations in intensity of the echo, are supplied through condensers 434 and 435 to respective diodes 436 and 437. These diodes are poled oppositely, the anode of the diode 436 being connected through resistance 438 to the cathode of the diode 437, and the cathode of the diode 436 and anode of diode 437 being connected together. The latter electrodes are connected through the winding of transformer 439 and condenser 440 to the midpoint on resistance 438.

The primary winding of transformer 439 is supplied over conductor 443 from a two-phase generator 444 shown in Fig. 1 and which may be geared to the rotating antenna 20. This generator develops two voltages in quadrature phase relation, one between ground and the conductor 443 and the other between ground and conductor 445. The voltage between ground and conductor 443 agrees in phase with the component of movement of the axis of directivity of the radiated beam in the horizontal plane during its rotation about the surface of the cone referred to. This voltage is induced in the secondary winding of transformer 439. It is of the same frequency as the cyclical variations in the received echo and therefore of the same frequency as the alternating voltage on resistance 438. This voltage on transformer 439 may be represented by the curve 446 of Fig. 17.

Let us assume that the remote object is at the right of the axis of the parabola and that under this condition the voltage at the upper terminal of resistance 438 is in aiding phase relation with the voltage on winding 439 across the diode 436. At the same time the voltage at the lower terminal of resistance 438 is in opposed relation with the voltage on winding 439 across diode 437. The result is that a unidirectional current of the polarity determined by diode 436 flows and tends to charge condenser 440 with voltage of a certain polarity. If the remote object be at the left of the axis of the parabola, then the opposite condition applies and diode 437 would be conducting and tend to charge the condenser 440 with voltage of the opposite polarity. Thus this condenser is charged with voltage of one polarity or the other depending upon the direction in azimuth of the remote object with respect to the axis of orientation of the parabola.

This unidirectional voltage is supplied through a filter 447, which removes any ripple component of the frequency of generator 444, to a vacuum tube voltmeter 461 and to equipment represented within the rectangle 448 and which operates in exactly the same way as the equipment previously described and which is represented within the rectangle 449 of Fig. 13. This equipment causes the motor 450 to drive the shaft 451 in one direction or the other dependent upon the polarity of voltage on condenser 440 and hence in accord with the direction of the remote object. This shaft controls an amplidyne equipment 453 which, through the cable 454, controls the motor mechanism 24 to rotate the antenna in the direction to cause the axis of the parabola to pass through the remote object.

In the lower left-hand portion of Fig. 15 is shown the rectangle 456 which represents similar equipment which operates through cable 457 to control the motor mechanism 23 to maintain the axis of the parabola directed at the remote object in the vertical plane. This mechanism responds to voltage likewise supplied through condensers 427 and 429 and thence through conductors 460 and it responds to the voltage generated by the generator 444 between ground and the conductor 445 which voltage is in quadrature relation to that supplied over conductor 443.

The unidirectional voltage produced by rectification of the received echo and which appears on resistance 415 and condenser 416 is also supplied to the control electrode of a direct current amplifier 463 the anode of which is connected to the positive terminal of the source of operating potential and the cathode of which is connected through a resistance 464 to the negative terminal of this source. The positive terminal of this resistance 464 is connected through conductor 465 to the receiver 34 to control the amplification of the receiver thereby to render it more sensitive to the received echo when the echo is weak, as when from objects at a distance. The time constant determined by this resistance 464 and the capacity in shunt with it are such, however, that the sensitivity of the receiver is not varied in response to the cyclical variation in intensity of the received echo produced by the rotation of the radiated beam.

While in this specification I have referred to particular frequencies, time intervals, distances, etc., it will, of course, be understood that the values mentioned are given merely by way of illustration and they may be varied widely. Many other variations and modifications in the circuit arrangement and instrumentalities employed may be made. I contemplate by the appended claims to cover any such variations and modifications as fall within the true spirit and scope of my invention.

What I claim as new and desire to secure by Letters Patent of the United States is:

1. In combination, in an echo system, means to transmit periodic pulses and to receive echoes of each pulse in the interval prior to the next transmitted pulse, a source of oscillations having constant frequency greater than the frequency of the transmitted pulses, means to relate the interval between any transmitted pulse and its received echo to the period of said high frequency oscillations, and to produce an indication dependent on the number of said periods in said interval, and means to vary the frequency of the radiated pulses while the indication of said interval remains fixed.

2. In combination, in an echo system, means to transmit periodic pulses and to receive echoes of each pulse in the interval prior to the next pulse, a source of oscillations having constant frequency greater than the frequency of the transmitted pulses, means to produce an indication dependent on the time interval between any radiated pulse and its received echo, and means to vary the frequency of the transmitted pulses while maintaining a fixed relation between the indication produced and the number of periods of said high frequency oscillations occurring in said time interval.

3. In an echo system, the combination of means to transmit periodic pulses of short wave oscillations and to receive an echo of each pulse in the period before transmission of the next pulse, means to produce an indication varying in accord with the interval between the transmitted pulses and the received echo thereof, means to vary the frequency of said transmitted pulses while maintaining said indication constant, said means comprising a source of oscillations of fixed frequency, means to relate the transmitted pulses and echoes thereof to fixed points in the period of said high frequency oscillations, and indicating means operable dependent upon the number of periods of said high frequency oscillations between the transmitted pulses and the received echo.

4. In a pulse echo system, a source of pulses having variable low frequency corresponding to the frequency of the pulses to be transmitted, a source of high frequency oscillations, means to transmit a pulse of short wave oscillations during each pulse of said variable low frequency pulses and at a time therein corresponding to a fixed point in the period of said high frequency oscillations, means to relate the echoes of said transmitted pulses to a fixed point in the period of said oscillations, and means operable in accord with the number of periods of said high frequency oscillations between said transmitted pulses and the echo thereof.

5. In a pulse echo system, a source of pulses having variable low frequency corresponding to the frequency of the pulses to be transmitted, a source of high frequency oscillations, means to transmit a pulse of short wave oscillations during each pulse of said variable low frequency pulses and at a time therein corresponding to termination of the first half cycle of said high frequency oscillations of polarity agreeing with the polarity of the corresponding pulse of said variable frequency pulses over an interval greater than a predetermined duration, means to relate the echoes of said transmitted pulses to a fixed point in the period of said oscillations, and means operable in accord with the number of periods of said high frequency oscillations between said transmitted pulses and the echoes thereof.

6. In combination, a source of high frequency oscillations, a source of low frequency pulses, means to generate additional pulses, said low frequency pulses having duration greater than one cycle of said high frequency oscillations, means to combine said low frequency pulses of one polarity with said high frequency oscillations to produce a resultant, means to differentiate said resultant, and means to initiate said additional pulses in response to peaks of like polarity and greater than a predetermined amplitude of the wave resulting from operation of said differentiating means.

7. In combination, a source of high frequency waves, a source of low frequency waves, means to combine said waves to produce a resultant, a limiter, means to supply said resultant through said limiter, said limiter being adapted to pass only those peaks of said resultant greater than a predetermined amplitude, means to differentiate the pulses passed by said limiter whereby pulses in groups appear at the output of said limiter, means to generate a low frequency wave, and means to synchronize said low frequency waves with the first pulse of each of said groups of greater than a predetermined amplitude.

8. The combination, in an echo system, of means to transmit periodic pulses subject to variation in frequency and to receive echoes of each transmitted pulse in the interval before the next pulse is transmitted, a viewing screen, and means to indicate said echoes on said viewing screen in space sequence corresponding to the time sequence in which they are received, said means including means to maintain the indication of each echo in fixed position on said screen during variations in said frequency, means to produce on said screen an identification mark, a movable element, means responsive to movement of said element to move said identification mark to agree on said screen with the indication thereon of any particular echo, a scale associated with said element having calibrations corresponding to the distance from which the identified echo is received, and means to maintain said calibrations accurate notwithstanding variations in the frequency of the transmitted periodic pulses.

9. The combination, in an echo system, of a pair of cathode ray devices each having a viewing screen, means to transmit periodic pulses and to deflect the ray of one of said devices over a predetermined path on its screen during an interval corresponding to the range of the equipment and to deflect the ray of the other device over a predetermined path on its screen during a short portion of said interval, a movable element, means responsive to the position of said element to vary the time in said interval when said deflection of said ray of said other device occurs, means to receive echoes of the transmitted pulses and to modulate said rays by the echoes received during the respective intervals whereby all of the echoes produce indications on the screen of said one device and a portion of said echoes produce indications on the screen of the other device, means to vary the frequency of said transmitted pulses while maintaining constant said interval and said portion and while maintaining said interval in constant relation to the time of the transmitted pulses, and means to maintain the position at which an echo from any particular distance is indicated on said other device in constant relation to the position of said movable element and independent of said frequency.

10. The combination, in an echo system, of a cathode ray device having a viewing screen, means to transmit periodic pulses subject to variations in frequency and to deflect the ray of said device across said screen during a brief portion of the interval between said transmitted pulses, means to receive echoes of the transmitted pulses and to modulate the ray of said device in accord with the echoes received during said deflection, a movable element, means to vary the time of said deflection with respect to the transmitted pulses in response to the movement of said element, whereby the indications of a particular echo move across said screen as said element is moved, and an echo received from a particular distance is indicated at a position on said screen dependent on the position of said movable element, whereby the distance from which any echo is received may be determined from the position of said movable element when said echo is indicated at a predetermined position on said screen, and means to maintain fixed, during variations in frequency to which said transmitted pulses are subjected, the relations between the distance from which said echoes are received and the positions of said element when echoes from different distances are indicated at said predetermined position on said screen.

11. In combination, a cathode ray device having a viewing screen, means to transmit periodic pulses subject to variations in frequency and to deflect the ray of said device across said screen during a brief portion of the interval between said transmitted pulses, means to produce a predetermined modulation of said ray at a predetermined time in its deflection thereby to produce an indication at a predetermined point on said screen, means to receive echoes of the transmitted pulses and to modulate the ray of said device in accord with the echoes received during said deflection, a movable element, means to vary the time of said deflection and of the modulation produced by said first modulation means synchronously with respect to the transmitted pulses in response to the movement of said element, whereby the indication of an echo moves across said screen as said element is moved, and the distance from which any echo is received may be determined from the position of said movable element when said echo is indicated at a position on said screen fixed relative to said predetermined point, and means to maintain fixed, during variations in frequency to which said transmitted pulses are subjected, the relations between the distance from which said echoes are received and the positions of said element when echoes from different distances are indicated at said predetermined point.

12. The combination, in an echo system, of means to transmit pulses occurring substantially periodically but subject to variations in the time interval between pulses, a cathode ray device, a generator of a sawtooth potential wave having the frequency of said pulses, the rise in each sawtooth of said wave starting in fixed time relation with respect to said transmitted pulses and continuing for a fixed interval, means to deflect the ray of said device from a starting position on said viewing screen over a predetermined path thereon in accord with said rise in said sawtooth wave, the fall of said sawtooth wave being completed to a fixed predetermined potential of said wave prior to occurrence of the next rise when the interval between adjacent transmitted pulses is shortest, whereby said starting point remains fixed during variation in the interval between adjacent transmitted pulses, and means to modulate the ray of said device during said deflection in accord with the instant received echoes.

13. The combination, in an echo system, of means to transmit pulses periodically and to receive echoes thereof in the intervals between successive pulses, a cathode ray device having a viewing screen, means to deflect the ray of said device over a predetermined path on said viewing screen during a brief portion of the entire interval between successive pulses and to modulate said ray by echoes received during said deflection, a movable element, means to vary the time of occurrence of said portion in said entire interval in accord with the movement of said element, whereby the indications corresponding to particular echoes move across said screen with movement of said element, and means responsive to that one of the echoes the indication of which appears at a predetermined position on said screen to control the position of said element thereby to maintain said indication at said position during change in the range from which said echo is received.

14. The combination, in an echo system, of a pair of viewing screens, means to transmit periodic pulses and to indicate on one of said viewing screens all echoes received from distances within the range of the equipment in space sequence corresponding to the time sequence in which they are received, an element movable through a range of positions corresponding to said distances, means to select echoes received from a short range of said distances, and to indicate said selected echoes on the other of said viewing screens in space sequence corresponding to the time sequence in which they are received, means to identify the selected echoes on said one screen, mans to vary said selecting means in response to and in accord with the position of said movable element to select echoes from different ranges, and means controlled by a particular one of the echoes indicated on said other screen to vary the position of said movable element to agree with the range from which said particular echo is received.

15. In combination, in an echo system, means to transmit periodic pulses, means to generate an aperture pulse having duration short relative to the time between said pulses and a second aperture pulse at a fixed time in said first aperture pulse, means synchronously to vary the time of occurrence of said aperture pulses over a time interval corresponding to the range from which echoes are received, a cathode ray device having a viewing screen, means to deflect the ray of said device over said screen during said first aperture pulse and to modulate said ray in accord with echoes received during said first aperture pulse, and means responsive to an echo received during said second aperture pulse to control said synchronous varying means to maintain said second aperture pulse coincident in time with said echo during variations in the range from which said echo is received.

16. In combination, in an echo system, means to transmit periodic pulses, means to generate an aperture pulse having duration short relative to the time between said pulses and a second aperture pulse at a fixed time in said first aperture pulse, means synchronously to vary the time of occurrence of said aperture pulses over a time interval corresponding to the range from which echoes are received, a cathode ray device having a viewing screen, means to deflect the ray of said device over said screen during said first aperture pulse and to modulate said ray in accord with echoes received during said first aperture pulse, and means to integrate the echoes received during successive portions of said second aperture pulse and to control said synchronous varying means to advance or delay the occurrence of said aperture pulses in accord with the portion of second aperture pulse in which said echo is received with greater integrated intensity.

17. In combination, in an echo system, means to transmit periodic pulses, means to generate an aperture pulse having duration short relative to the time between said pulses and a second aperture pulse at a fixed time in said first aperture pulse, means synchronously to vary the time of occurrence of said aperture pulses over a time interval corresponding to the range from which echoes are received, a cathode ray device having a viewing screen, means to deflect the ray of said device over said screen during said first aperture pulse and to modulate said ray in accord with echoes received during said first aperture pulse, means to generate a transient oscillation during said second aperture pulse having a period substantially equal to the duration of said second aperture pulse whereby negative and positive peaks occur during successive portions of said second aperture pulse, means to combine said peaks with the received echo whereby one of said peaks is aided and the other opposed by the received echo, and means to advance or retard the occurrence of said aperture pulses in accord with the relation between the extents of said aiding and opposing of said peaks and echo.

18. In combination, in an echo system, means to transmit periodic pulses, means to generate an aperture pulse having duration short relative to the time between said pulses and a second aperture pulse at a fixed time in said first aperture pulse, means synchronously to vary the time of occurrence of said first aperture pulse over a time interval corresponding to the range from which echoes are received, a cathode ray device having a viewing screen, means to deflect the ray of said device over said screen during said first aperture pulse and to modulate said ray in accord with echoes received during said first aperture pulse, means to mix with the echo received during said second aperture pulse two pulses of opposite polarity occurring in succession, thereby to produce two resultant waves each being the algebraic sum of the echo and one of said pulses, a pair of unilateral conducting devices, a condenser, means to supply said resultant waves to said condenser through respective ones of said unilateral conducting devices, said unilateral conducting devices being poled oppositely with respect to said echo, and means to advance or delay the occurrence of said aperture pulses in accord with the polarity and magnitude of the charge on said condenser.

19. The combination, in a system to integrate a pulse wave over successive portions of an aperture of time, of an electron discharge device having an anode, a cathode and a control electrode, an oscillatory circuit connected between said cathode and both said control electrode and anode having a natural period equal to said aperture of time, said control electrode being biased to prevent oscillation, means to remove said bias during said aperture thereby to produce a one-cycle transient in said circuit, a pair of peak rectifiers having a common load condenser, means to split said wave to be integrated into waves of opposite phase and to combine said waves of opposite phase with said one-cycle transient to produce two resultant waves, and means to supply said resultant waves to said respective detectors in opposite sense.

20. In combination, a condenser, a pair of unilateral conducting devices, a source of periodically varying voltage, means to supply said voltage in like sense to said condenser through both of said unilateral conducting devices, said devices being poled oppositely, a second source of voltage to be integrated over successive half cycles of said periodically varying voltage, means to split the voltage of said last source into two voltage waves of opposite phase and to supply one of said waves to said condenser through one of said unilateral conducting devices and to supply the other of said waves to said condenser through the other of said unilateral conducting devices.

21. The combination, in an echo system, of means to transmit periodic pulses and to receive echoes thereof during intervals between said pulses, means to generate an aperture pulse short relative to the interval over which echoes are received and long relative to the period of one of said pulses, a viewing screen, means to indicate echoes received during said aperture pulse on said viewing screen in space sequence corresponding to the time sequence in which they are received, means to generate a second aperture pulse at a predetermined time in said first aperture, said second aperture pulse having duration substantially equal to one of said radiated pulses, and means responsive to energy received during said second aperture pulse to control the time of occurrence of both of said aperture pulses.

22. The combination, in an echo system, of means to transmit periodic pulses toward a distant object and to receive echoes thereof in the intervals between said pulses, means to produce an aperture pulse short relative to the interval over which echoes are received and long relative to one of said transmitted pulses, a viewing screen, means to indicate echoes received during said aperture pulse on said screen in space sequence corresponding to the time sequence in which they are received, means to produce a second aperture pulse at a predetermined time in said first aperture pulse and having a duration substantially equal to one of said transmitted pulses, means to vary in unison the time of occurrence of said aperture pulses until the echo from said distant object is received during said second aperture pulse and is indicated at a predetermined position on said screen, and means responsive to said echo during said second aperture pulse to maintain said indication at said predetermined position during changes in the range to said object.

23. The combination, in an echo system, of means to direct a beam of transmitted periodic pulses toward a distant object and to receive echoes thereof in the intervals between said pulses, means to produce an aperture pulse short relative to the interval over which echoes are received and long relative to one of said transmitted pulses, a viewing screen, means to indicate echoes received during said aperture pulse on said screen in space sequence corresponding to the time sequence in which they are received, means to produce a second aperture pulse at a predetermined time in said first aperture pulse and having a duration substantially equal to one of said transmitted pulses, means to vary in unison the time of occurrence of said aperture pulses until the echo from said distant object is received during said second aperture pulse and is indicated at a predetermined position on said screen, and means responsive to said echo during said second aperture pulse to maintain said indication at said predetermined position during changes in the range to said object and to maintain said beam directed toward said object during movements of said object transversely of said beam.

24. The combination, in a directive radio receiving system, of means to rotate the axis of directivity of said system about the surface of a cone, whereby waves are received having cyclical variations therein having a time phase relation dependent upon the direction of propagation of said waves with respect to the axis of said cone, means to produce two electromotive forces of opposite phase having time phase relation dependent on the time phase relation of said cyclical variation, means to produce a third electromotive force of the same frequency and agreeing in time phase with the change in orientation of said axis of directivity as projected on a predetermined plane extending through the axis of said cone, a pair of unilateral conducting devices, a condenser, and a circuit having said condenser and third source both connected in series with two branches, each including a respective one of said two unilateral conducting devices and a respective one of said two sources, and means responsive to voltage on said condenser to operate in accord with the relation between said axis of said cone and the direction of propagation of the received waves.

25. In combination, means to transmit periodic pulses and to receive echoes thereof, echo indicating means, means to maintain said indicating means normally inoperative and to render it operative to indicate echoes received over a fixed brief interval of time variable in its time of occurrence between said pulses, and means responsive to a single echo received in a portion of said interval of time to control said time of occurrence in accord with variations in the range from which said single echo is received.

26. In combination, means to transmit periodic pulses, directional means oriented to receive echoes thereof from a particular direction, echo indicating means, means to maintain said indicating means normally inoperative and to render it operative to indicate echoes received over a fixed brief interval of time variable in its time of occurrence between said pulses, and means responsive to a single echo received in a portion of said interval of time to control said time of occurrence in accord with variations in the range from which said single echo is received and to vary the orientation of said receiving means in accord with the variations in the direction from which said single echo is received.

27. In combination, means to transmit periodic pulses, directional means oriented to receive echoes thereof from a particular direction, echo indicating means, means to maintain said indicating means normally inoperative and to render it operative to indicate echoes received over a fixed brief interval of time occurring at a variable time after each transmitted pulse, and means responsive to a single echo received in a portion of said fixed interval of time to vary the duration of said variable time in accord with the range from which said echo is received and to maintain said receiving means oriented in the direction from which said echo is received, both during movement of the object producing said echo.

28. In combination, a condenser, a pair of unilateral conducting devices, a source of periodically varying voltage, means to supply said voltage in like sense to said condenser through both of said unilateral conducting devices, said devices being poled oppositely, a second source of voltage, means to split the voltage of said last source into two voltage waves of opposite phase and to supply one of said waves to said condenser through one of said unilateral conducting devices and to supply the other of said waves to said condenser through the other of said unilateral conducting devices whereby the charge in said condenser varies as the difference between the intensity of one of said waves integrated over one set of altrnate half cycles of said other wave and the intensity of said one wave integrated over the other set of alternate half cycles of said other wave.

29. The combination, in an echo system, of means to transmit periodic pulses and to receive echoes of each pulse in the interval prior to the next transmitted pulse, a source of oscillations having constant frequency greater than the frequency of said transmitted pulses, means to relate each transmitted pulse to a fixed time in the cycle of said high frequeny oscillations, a phase shift means having an output circuit, means to supply said oscillations through said phase shift means to said output circuit, means to produce a pulse coincident with a received echo and fixed in time in the cycle of said high frequency oscillations in said output circuit, and means responsive to the time of reception of said echo in said pulse to vary said phase shift means to maintain said pulse coincident with said echo during variations in range from which said echo is received.

30. The combination, in an echo system, of means to transmit periodic pulses and to receive echoes of each pulse in the interval prior to the next transmitted pulse, a source of oscillations having constant frequency greater than the frequency of said transmitted pulses, means to relate each transmitted pulse to a fixed time in the cycle of said high frequency oscillations, a phase shift means having an output circuit, means to supply said oscillations through said phase shift means to said output circuit, means to produce a pulse coincident with a received echo and fixed in time in the cycle of said high frequency oscillations in said output, and means to vary said phase shift means in response to variation in the range from which said echo is received to maintain said pulse coincident with said echo.

31. The combination, in an echo system, means to transmit periodic pulses and to receive echoes of each pulse in the interval prior to the next transmitted pulse, a source of oscillations having constant frequency greater than the frequency of said transmitted pulses, means to relate each transmitted pulse to a fixed time in the cycle of said high frequency oscillations, a circuit, means to supply said oscillations with variable phase to said circuit, means to generate a pulse in fixed time relation to the cycle of said oscillations in said circuit, means to receive echoes of said transmitted pulses during said periodic pulses, means to integrate said echoes over successive portions of each of said pulses, and means controlled by the difference in the integrals produced by said last means over said successive portions to control the phase of oscillations supplied by said variable phase oscillation supply means to maintain said pulses coincident with the received echoes.

32. The combination, in an echo system, means to transmit periodic pulses and to receive echoes of each pulse in the interval prior to the next transmitted pulse, a source of oscillations having constant frequency greater than the frequency of said transmitted pulses, means to relate each transmitted pulse to a fixed time in the cycle of said high frequency oscillations, a circuit, means to supply said oscillations with variable phase to said circuit, means to generate an aperture pulse wave having pulses of duration short relative to the interval between said transmitted pulses, means to combine said aperture pulse wave with oscillations derived from said circuit to produce a resultant pulse wave, means to derive from said resultant a second aperture pulse wave having pulses occurring during said first aperture pulse and having fixed time relation to said oscillations in said circuit, means to receive echoes during said first aperture pulse, and means responsive to echoes received during said second aperture pulse to control the time of occurrence of said first aperture pulse.

33. The combination, in a pulse echo system, a source of oscillations having period short relative to the interval over which echoes are received, means to transmit periodic pulses having predetermined adjustable time relation to said oscillations, means to generate an aperture pulse wave having aperture pulses of duration less than the interval over which echoes are received but greater than the period of said oscillations, means to combine said oscillations with said aperture pulse wave to produce a resultant pulse fixed in time phase with said oscillations, means to receive choes during said aperture pulses, and means responsive to echoes received over a time within said aperture pulse determined by said resultant pulse to indicate the range from which said echo is received.

34. In an echo system, means to produce two oscillatory waves of the same frequency, means to transmit a pulse fixed in time relation to one of said waves and to receive an echo thereof, means to generate a second pulse fixed in time relation with the other of said waves, means to vary the phase between said waves to such a relation that said second pulse agrees in time with receipt of said echo, and means responsive to the echo received during said second pulse to maintain said agreement in time during variation in range from which said echo is received.

35. In an echo system, means to produce two oscillatory waves of the same frequency, means to transmit a pulse fixed in time relation to one of said waves and to receive an echo thereof, means to generate a second pulse fixed in time relation with the other of said waves, means to vary the phase between said waves to such a relation that said second pulse agrees in time with receipt of said echo, means responsive to the echo received during said second pulse to maintain said agreement in time during variation in range from which said echo is received, and means controlled by said last means to indicate said range.

36. In an echo system, means to produce two oscillatory waves of the same frequency, means to transmit a pulse fixed in time relation to one of said waves and to receive an echo thereof, means to generate a second pulse fixed in time relation with the other of said waves, means to vary the phase between said waves to such a relation that said second pulse agrees in time with receipt of said echo, means controlled by the relation between the amount of said echo received during successive portions of said second pulse to indicate the range from which said echo is received.

37. In an echo system, means to produce two oscillatory waves of the same frequency, directive means to transmit toward a distant body a pulse fixed in time relation to one of said waves and to receive an echo of said pulse, means to generate a second pulse fixed in time relation with the other of said waves, means to vary the phase relation between said waves to maintain coincidence between said second pulse and receipt of said echo during variations in range from which said echo is received, and means responsive to said echo to maintain said directive means oriented toward said body.

38. In an echo system, means to produce two oscillatory waves of the same frequency, directive means to transmit toward a distant body a pulse fixed in time relation to one of said waves and to receive an echo of said pulse, means to generate a second pulse fixed in time relation with the other of said waves, means to vary the phase relation between said waves to maintain coincidence between said second pulse and receipt of said echo during variations in range from which said echo is received, a cathode ray device, and means to indicate coincidence on said cathode ray device of said echo and the time of occurrence of said pulse.

39. In an echo system, means to produce two oscillatory waves of the same frequency, directive means to transmit toward a distant body a pulse fixed in time relation to one of said waves and to receive an echo of said pulse, means to generate a second pulse fixed in time relation with the other of said waves, means to vary the phase relation between said waves to maintain coincidence between said second pulse and receipt of said echo during variations in range from which said echo is received, a cathode ray device having a viewing screen, means to deflect the ray of said device across said screen during an interval short relative to the interval between transmission of said pulse and reception of said echo and long relative to the duration of said second pulse, means to produce a predetermined modulation of the ray of said device at a fixed time in said second pulse and to modulate said ray in accord with the received echo, and means controlled by the echo received during said second pulse to vary the time of occurrence of said interval to maintain coincidence between the indication produced on said screen by said echo and by said predetermined modulation.

40. The method of comprising the steps of generating relatively high frequency oscillations, generating a pulse energy wave composed of control pulses recurring at a relatively low frequency, generating a second pulse energy wave composed of periodic pulses of predetermined duration recurring at said low frequency, the pulses of both said waves having duration greater than one cycle of said oscillations, combining said oscillations and said first wave, each pulse of said second wave being initiated in response conjointly to said combined oscillations and first wave during each of said control pulses at a time therein fixed in the period of a cycle of said high frequency oscillations, said time being determined by the termination of the first half cycle of said oscillations or fraction thereof having the same polarity as said control pulse for greater than a predetermined minimum interval, and independently varying the frequency of said control pulses thereby to vary the frequency of said second pulse energy wave.

41. The method of synchronizing comprising the steps of generating a high frequency wave of substantially constant frequency, generating a relatively low frequency control pulse wave having periodic pulses of predetermined duration recurring at a frequency to be produced and subject to frequency variation, generating second periodic pulses of predetermined duration recurring at said relatively low frequency, said high frequency wave having more than one cycle occurring during said first and second periodic pulses, combining said high frequency and said control pulse waves, each of said second pulses being initiated in response conjointly to said combined waves during a corresponding one of said first pulses and at a time therein fixed in the period of a cycle of said high frequency wave, whereby said second pulses are rigidly synchronized with said high frequency wave though subject to said frequency variations.

42. In combination, a source of high frequency oscillations, a source of first periodic pulses having duration greater than one cycle of said oscillations and recurring at a relatively low frequency, a source of second periodic pulses also having duration greater than one cycle of said oscillations and adapted to be synchronized at said low frequency, and means conjointly responsive to said high frequency oscillations and said first pulses to initiate one of said second pulses during each of said first pulses at a time therein fixed in the period of a cycle of said high frequency oscillations, said means being responsive to the termination of the first half cycle of said oscillations or fraction thereof having the same polarity as said first pulse for greater than a predetermined minimum interval thereby to synchronize said second pulses.

43. In combination a source of high frequency oscillations, an independent source of low frequency control pulses, means to generate substantially periodic timing pulses adapted to be synchronized at said low frequency, said control pulses and timing pulses both having duration greater than one cycle of said high frequency oscillations, means to combine said oscillations and said control pulses to produce a resultant wave, and means controlled by said resultant wave to initiate each of said timing pulses during one of said control pulses and at a time therein fixed in the period of a cycle of said high frequency oscillations, whereby the initiation of each timing pulse is rigidly synchronized with said high frequency oscillations and the frequency of recurrence is controlled by said control pulses.

DONALD E. NORGAARD.

REFERENCES CITED

The following references are of record in the file of this patent:

UNITED STATES PATENTS

| Number | Name | Date |
| --- | --- | --- |
| 1,924,174 | Wolf | Aug. 29, 1933 |
| 2,132,655 | Smith | Oct. 11, 1938 |
| 2,145,332 | Bedford | Jan. 31, 1939 |
| 2,171,536 | Bingley | Sept. 5, 1939 |
| 2,212,558 | Blumlein | Aug. 27, 1940 |